United States Patent
Jun et al.

(10) Patent No.: US 10,768,313 B2
(45) Date of Patent: Sep. 8, 2020

(54) POSITIONING METHOD, ELECTRONIC DEVICE, AND STORAGE MEDIUM

(71) Applicant: Samsung Electronics Co., Ltd., Gyeonggi-do (KR)

(72) Inventors: Woo-Jin Jun, Gyeonggi-do (KR); Hyun-Sang Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 254 days.

(21) Appl. No.: 15/935,895

(22) Filed: Mar. 26, 2018

(65) Prior Publication Data
US 2018/0275285 A1    Sep. 27, 2018

(30) Foreign Application Priority Data
Mar. 24, 2017 (KR) .................. 10-2017-0037638

(51) Int. Cl.
  *G01S 19/48*   (2010.01)
  *G01S 5/02*    (2010.01)
  *H04W 4/029*   (2018.01)

(52) U.S. Cl.
CPC ............. *G01S 19/48* (2013.01); *G01S 5/02* (2013.01); *H04W 4/029* (2018.02); *G01S 5/0252* (2013.01)

(58) Field of Classification Search
CPC .......... G01S 19/48; G01S 19/41; G01S 19/20; G01S 5/02; G01C 21/165; G01C 21/28; H04W 4/029
USPC .................................................... 342/357.31
See application file for complete search history.

(56) References Cited

U.S. PATENT DOCUMENTS

| 2010/0008337 | A1  | 1/2010  | Bajko |
| 2012/0087212 | A1* | 4/2012  | Vartanian ............... G01S 15/08 367/118 |
| 2014/0107919 | A1  | 4/2014  | Venkatraman et al. |
| 2016/0080911 | A1  | 3/2016  | Kay et al. |
| 2016/0345136 | A1  | 11/2016 | Christie et al. |
| 2018/0164400 | A1* | 6/2018  | Wirola ..................... H04L 67/18 |

FOREIGN PATENT DOCUMENTS

| EP | 2 889 578  | 7/2015  |
| KR | 101079905  | 10/2011 |
| KR | 101143503  | 4/2012  |
| KR | 101191264  | 10/2012 |
| KR | 101311565  | 9/2013  |

OTHER PUBLICATIONS

European Search Report dated Aug. 27, 2018 issued in counterpart application No. 18162053.5-1206, 7 pages.

* cited by examiner

*Primary Examiner* — Harry K Liu
(74) *Attorney, Agent, or Firm* — The Farrell Law Firm, P.C.

(57) ABSTRACT

Disclosed is an electronic device including a first circuit for measuring positions using a first positioning method; a second circuit for measuring positions using a second positioning method; a memory for storing information on a service zone; and a processor is configured to identify a first position using the first circuit; determine whether the first position is included in the service zone; identify a second position using the second circuit when the first position is included in the service zone; and determine the second position to be a position of the electronic device.

20 Claims, 16 Drawing Sheets

POSITIONING METHOD, ELECTRONIC DEVICE, AND STORAGE MEDIUM

PRIORITY

This application claims priority under 35 U.S.C. § 119(a) to Korean Patent Application Serial No. 10-2017-0037638, which was filed in the Korean Intellectual Property Office on Mar. 24, 2017, the entire content of which is incorporated herein by reference.

BACKGROUND

1. Field of the Disclosure

The present disclosure relates generally to a positioning method of an electronic device and an apparatus therefor.

2. Description of the Related Art

For the positioning of an electronic device, a satellite-based system, such as a global positioning system (GPS), is generally utilized outdoors. In addition, indoor positioning may be performed based on a network communication method (e.g., cellular communication or short range communication) and/or sensor positioning data (e.g., geomagnetic data). A positioning method for building a database by collecting an RF signal and/or sensor measurement data in a service zone and determining the position by comparing the database with an RF signal and/or sensor measurement data, which are measured by an electronic device, is utilized. For example, the service zone may be a space in which indoor positioning service information is provided.

When a GPS signal is received in a service zone (e.g., when the ceiling of the service zone is partially open or formed with glass, or when the service zone is an open space (e.g., a street mall or a baseball park)), an electronic device may determine that the electronic device is not located in a shadow zone or an area having a weak electric field, or may determine that the device is not located in a service zone. When the electronic device determines that it is located in an open area, the electronic device may preferentially select a positioning result obtained using GPS. In this case, the positioning accuracy in the service zone may deteriorate, or the electronic device may be unable to perform positioning thereafter at another place.

SUMMARY

In accordance with an aspect of the present disclosure, an electronic device includes a first circuit for measuring positions using a first positioning method; a second circuit for measuring positions using a second positioning method; a memory for storing information on a service zone; and a processor is configured to identify a first position using the first circuit; determine whether the first position is included in the service zone; identify a second position using the second circuit when the first position is included in the service zone; and determine the second position to be a position of the electronic device.

In accordance with an aspect in the present disclosure, a positioning method of an electronic device includes identifying a first position of the electronic device using a first positioning method; determining whether the first position is included in a service zone; identifying a second position of the electronic device using a second positioning method when the first position is included in the service zone; and determining the second position to be a position of the electronic device.

In accordance to an aspect in the present disclosure, a storage medium storing instructions which, when executed by at least one processor, cause the at least one processor to execute at least one operation includes identifying a first position of the electronic device using a first positioning method; determining whether the first position is included in a service zone; identifying a second position of the electronic device using a second positioning method when the first position is included in the service zone; and determining the second position to be a position of the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
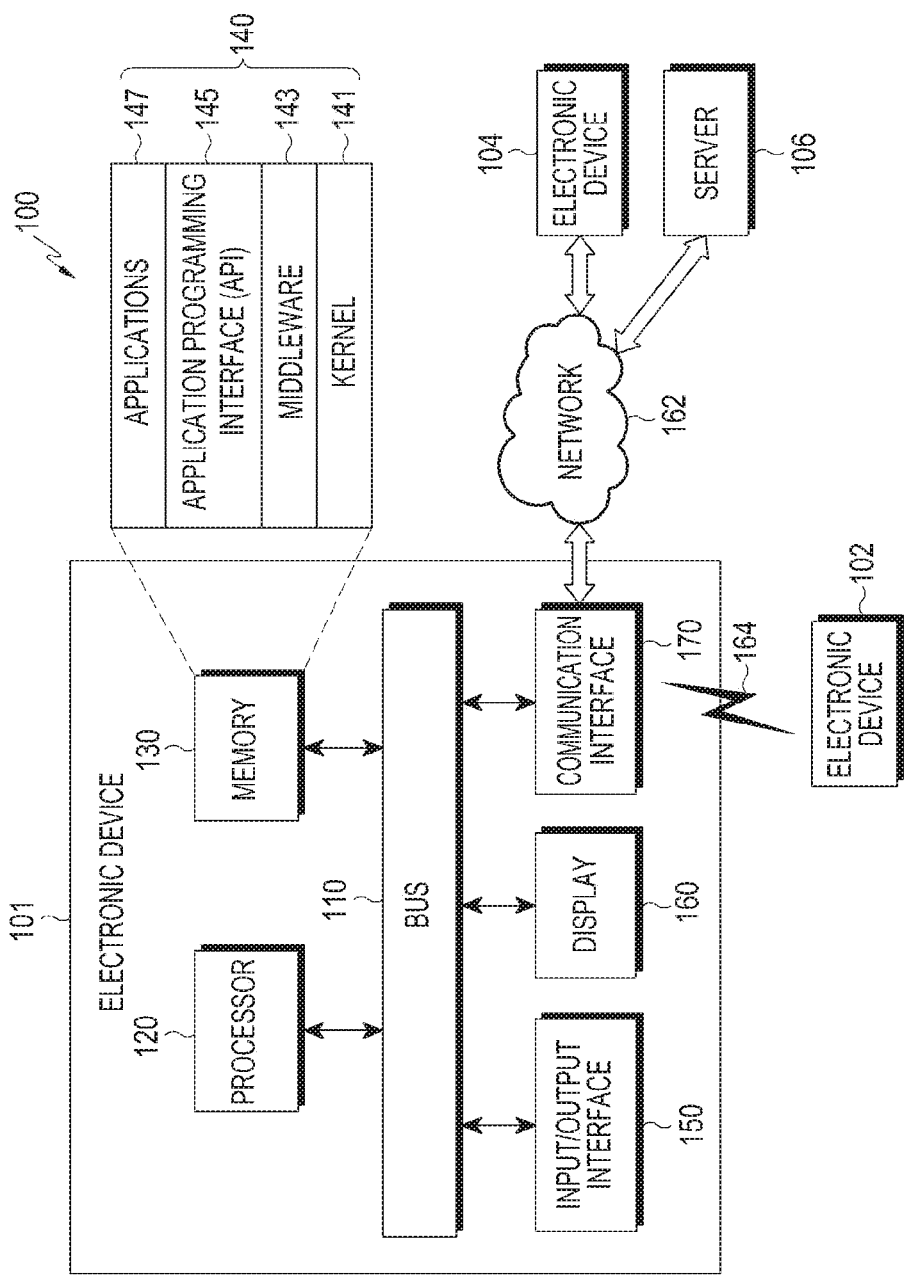
FIG. 1 illustrates an electronic device within a network environment, according to various embodiments of the present disclosure.

The embodiments and the terms used herein are not intended to limit the technology disclosed herein to specific forms, and should be understood to include various modifications, equivalents, and/or alternatives to the corresponding embodiments. In describing the drawings, similar reference numerals may be used to designate similar elements. A singular expression may include a plural expression unless they are definitely different in a context. As used herein, singular forms may include plural forms as well unless the context clearly indicates otherwise.

The expressions "a first", "a second", "the first", or "the second" used in describing various embodiments of the present disclosure may modify various components regardless of the order and/or the importance thereof, but do not limit the corresponding components. When an element (e.g., a first element) is referred to as being "(functionally or communicatively) connected," or "directly coupled" to another element (e.g., second element), the element may be connected directly to the other element, or may be connected to the another element through yet another element (e.g., third element). The term "and/or" covers a combination of a plurality of items, or any of the plurality of items.

The expression "configured to" as used in various embodiments of the present disclosure may be interchangeably used with, for example, "suitable for", "having the capacity to", "designed to", "adapted to", "made to", or "capable of" in terms of hardware or software, according to the circumstances. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing only the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type (e.g., a watch, a ring, a bracelet, an anklet, a necklace, a pair of glasses, a contact lens, or a head-mounted device (HMD)), a fabric- or clothing-integrated type (e.g., a piece of electronic clothing), a body-mounted type (e.g., a skin pad or tattoo), and a bio-implantable type (e.g., an implantable circuit). The electronic device may include at least one of, for example, a television, a digital versatile disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to various embodiments of the present disclosure, the electronic device may include at least one of various medical devices (e.g., portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a GPS receiver, an event data recorder (EDR), a flight data recorder (FDR), a vehicle infotainment devices, an electronic device for a ship (e.g., a navigation device or a gyro-compass), an avionics device, a security device, an automotive head unit, a robot for home or industry, an automated teller machine (ATM), a point-of-sales (POS) terminal, or an Internet of things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments of the present disclosure, an electronic device may include at least one of a part of furniture or a building/structure, an electronic board, an electronic signature receiving device, a projector, and various types of measuring instruments (e.g., a water meter, an electric meter, a gas meter, a radio wave meter, etc.). The electronic device may be flexible, or may be a combination of one or more of the aforementioned various devices. The electronic device is not limited to the above described devices. In the present disclosure, the term "user" may indicate a person using an electronic device or a device (e.g., an artificial intelligence electronic device) using an electronic device.

FIG. 1 illustrates an electronic device within a network environment, according to various embodiments of the present disclosure.

Referring to FIG. 1, an electronic device 101 within a network environment 100 according to various embodiments of the present disclosure may include a bus 110, a processor 120, a memory 130, an input/output interface 150, a display 160, and a communication interface 170 (or a communication circuit). The electronic device 101 may omit at least one of the elements, or may further include other elements.

The bus 110 may include a circuit for connecting elements 120-170 to each other and for transferring communications (e.g., control messages or data) between the elements.

The processor 120 may include one or more of a CPU, an AP, or a communications processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment of the present disclosure, the memory 130 may store software and/or a program 140. The program 140 may include, for example, a kernel 141, middleware 143, an application programming interface (API) 145, and/or applications 147. At least some of the kernel 141, the middleware 143, or the API 145 may be referred to as an operating system (OS).

The kernel 141 may control or manage system resources (e.g., the bus 110, the processor 120, or the memory 130) used for executing an operation or function implemented by other programs (e.g., the middleware 143, the API 145, or applications 147). Furthermore, the kernel 141 may provide an interface through which the middleware 143, the API 145, or the applications 147 may access the individual elements of the electronic device 101 to control or manage system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign priorities for using the system resources (e.g., the bus 110, the processor 120, the memory 130, etc.)

of the electronic device 101 to one or more of the applications 147, and may process the one or more task requests.

The API 145 is an interface through which the applications 147 control functions provided from the kernel 141 or the middleware 143, and may include, for example, at least one interface or function (e.g., instruction) for file control, window control, image processing, or text control.

The input/output interface 150 may forward instructions or data, input from a user or an external device, to the other element(s) of the electronic device 101, or may output instructions or data, received from other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of contents (e.g., text, images, videos, icons, symbols, etc.) for a user. The display 160 may include a touch screen and may receive, for example, a touch, a gesture, or a proximity or hovering input using an electronic pen or a body part of the user.

The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device.

The wireless communication may include, for example, cellular communication that uses at least one of LTE, LTE-advanced (LTE-A), code division multiple access (CDMA), wideband CDMA (WCDMA), universal mobile telecommunications system (UMTS), wireless broadband (WiBro), global system for mobile communications (GSM), etc. According to an embodiment of the present disclosure, the wireless communication may include, for example, at least one of Wi-Fi, light fidelity (Li-Fi), Bluetooth™, Bluetooth low power (BLE), ZigBee, near field communication (NFC), magnetic secure transmission, radio frequency (RF) transmission, or a body area network (BAN), as the short range communication 164. The wireless communication may include a global navigation satellite system (GNSS). The GNSS may be, for example, a GPS, a global navigation satellite system (GLONASS), a BeiDou navigation satellite system (BeiDou) or Galileo, the European global satellite-based navigation system. Hereinafter, in this disclosure, the term "GPS" is interchangeable with the term "GNSS". The wired communication may include, for example, at least one of a universal serial bus (USB), a high definition multimedia interface (HDMI), recommended standard 232 (RS-232), power line communication, a plain old telephone service (POTS), etc. The network 162 may include a telecommunications network, e.g., at least one of a computer network (e.g., LAN or WAN), the Internet, or a telephone network.

Each of the first and second external electronic devices 102 and 104 may be of a type identical to or different from that of the electronic device 101. According to various embodiments of the present disclosure, all or some of the operations executed in the electronic device 101 may be executed in another electronic device or a plurality of electronic devices (e.g., the electronic devices 102 and 104, or the server 106). When the electronic device 101 has to perform some functions or services automatically or in response to a request, the electronic device 101 may make a request for performing at least some functions relating thereto to another device instead of performing the functions or services by itself, or may perform additional processing thereon. Another electronic device may execute the requested functions or the additional functions, and may deliver information about the result of execution thereof to the electronic device 101. The electronic device 101 may provide the received result as it is or may additionally process the received result and provide the requested functions or services. For this purpose, cloud computing, distributed computing, or client-server computing technology may be used.

Figure 2:
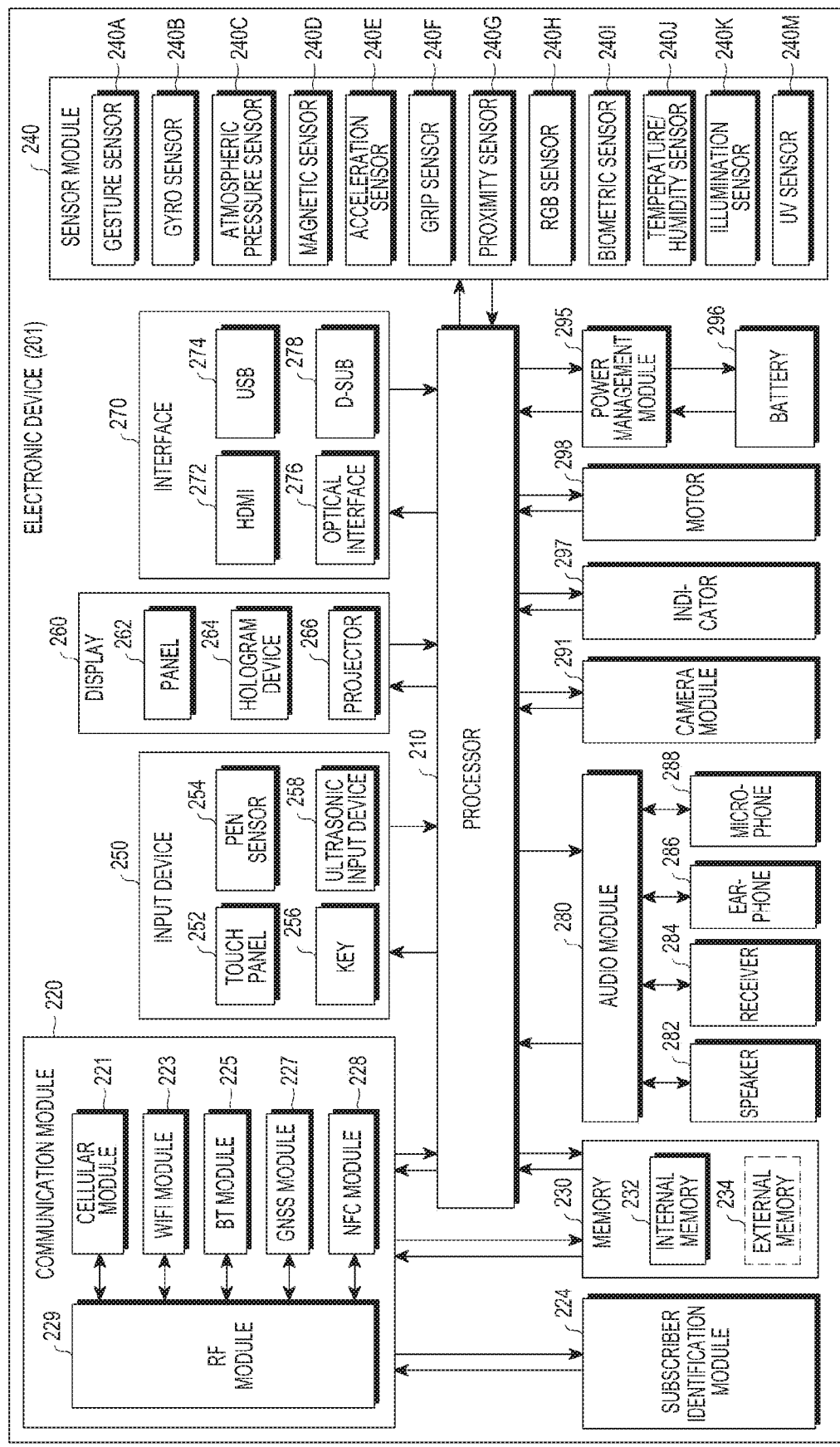
FIG. 2 is a block diagram of the electronic device, according to various embodiments of the present disclosure.

FIG. 2 is a block diagram of an electronic device 201, according to various embodiments. The electronic device 201 may include, for example, all or part of the electronic device 101. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an OS or an application program. The processor 210 may be implemented as, for example, a system on chip (SoC). The processor 210 may further include a graphic processing unit (GPU) and/or an image signal processor (ISP). The processor 210 may also include at least some of the elements of electronic device 201 (e.g., a cellular module 221). The processor 210 may load, in a volatile memory, instructions or data received from at least one of the other elements (e.g., a non-volatile memory), process the loaded instructions or data, and store the result data in the non-volatile memory.

The communication module 220 may have a configuration that is the same as or similar to that of the communication interface 170. The communication module 220 may include, for example, a cellular module 221, a Wi-Fi module 223, a Bluetooth (BT) module 225, a GNSS module 227, an NFC module 228, and an RF module 229. The cellular module 221 may provide, for example, a voice call, a video call, a text message service, an Internet service, etc. through a communication network. According to an embodiment of the present disclosure, the cellular module 221 may identify and authenticate the electronic device 201 within a communication network using the SIM 224 (e.g., a SIM card). The cellular module 221 may perform at least some of the functions that the processor 210 may provide. The cellular module 221 may include a CP. At least some (e.g., two or more) of the cellular module 221, the Wi-Fi module 223, the BT module 225, the GNSS module 227, and the NFC module 228 may be included in one integrated circuit (IC) chip or IC package. The RF module 229 may transmit/receive, for example, a communication signal (e.g., an RF signal). The RF module 229 may include, for example, a transceiver, a power amp module (PAM), a frequency filter, a low noise amplifier (LNA), an antenna, etc. At least one of the cellular module 221, the Wi-Fi module 223, the BT module 225, the GNSS module 227, and the NFC module 228 may transmit/receive an RF signal through a separate RF module. The SIM 224 may include, for example, a card that includes a SIM and/or an embedded SIM, and may include unique identification information e.g., an integrated circuit card identifier (ICCID)) or subscriber information (e.g., an international mobile subscriber identity (IMSI)).

The memory 230 may include, for example, an internal memory 232 or an external memory 234. The internal memory 232 may include, for example, at least one of a volatile memory (e.g., a DRAM, an SRAM, an SDRAM, etc.) and a non-volatile memory (e.g., a one time programmable ROM (OTPROM), a PROM, an EPROM, an EEPROM, a mask ROM, a flash ROM, a flash memory, a hard-disk drive, or a solid state drive (SSD)). The external memory 234 may include a flash drive, for example, a compact flash (CF), a secure digital (SD), a micro-SD, a mini-SD, an eXtreme digital (xD), a multi-media card (MMC), a memory stick, etc. The external memory 234 may be functionally and/or physically connected to the electronic device 201 through any of the various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In various embodiments of the present disclosure, the electronic device 201 may further include a processor, which is configured to control the sensor module 240, as part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. In addition, the touch panel 252 may further include a control circuit. The touch panel 252 may further include a tactile layer to provide a tactile reaction to a user. The (digital) pen sensor 254 may, for example, be a part of a touch panel or may include a separate recognition sheet. The key 256 may include, for example, a physical button, an optical key, or a keypad. The ultrasonic input device 258 may detect ultrasonic waves, which are generated by an input tool, through a microphone 288, and may identify data corresponding to the detected ultrasonic waves.

The display 260 may include a panel 262, a hologram device 264, a projector 266, and/or a control circuit for controlling them. The panel 262 may be implemented to be, for example, flexible, transparent, or wearable. The panel 262 may include the touch panel 252, and one or more modules. According to an embodiment of the present disclosure, the panel 262 may include a pressure sensor (or a POS sensor) which may measure the strength of pressure of a user's touch. The pressure sensor may be implemented by being integrated with the touch panel 252, or may be implemented in one or more separate sensors regardless of the touch panel 252. The hologram device 264 may show a three dimensional image in the air using light interference. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication circuit 170. Additionally or alternatively, the interface 270 may, for example, include a mobile high-definition link (MHL) interface, an SD card/MMC interface, or an Infrared Data Association (IrDA) standard interface.

The audio module 280 may convert, for example, sound into an electrical signal, and vice versa. At least some elements of the audio module 280 may be included, for example, in the input/output interface 150. The audio module 280 may process sound information that is input or output through, for example, a speaker 282, a receiver 284, earphones 286, the microphone 288, etc. The camera module 291 is a device that can photograph a still image and a moving image. According to an embodiment of the present disclosure, the camera module 291 may include one or more image sensors (e.g., a front sensor or a rear sensor), a lens, an ISP, or a flash (e.g., an LED or a xenon lamp). The power management module 295 may manage, for example, the power of the electronic device 201.

According to an embodiment of the present disclosure, the power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure, for example, a remaining charge of the battery 296, and a voltage, a current, or a temperature while charging. The battery 296 may include, for example, a rechargeable battery and/or a solar battery.

The indicator 297 may display a particular state, for example, a booting state, a message state, a charging state, etc. of the electronic device 201 or a part (e.g., the processor 210) of the electronic device 201. The motor 298 may convert an electrical signal to mechanical vibration, and may generate vibration, haptic effects, etc. The electronic device 201 may include a mobile TV support device (e.g., GPU) that can process media data according to a standard, such as digital multimedia broadcasting (DMB), digital video broadcasting (DVB), mediaFlo™, etc. Each of the above-described component elements of hardware may be configured with one or more components, and the names of the corresponding component elements may vary based on the type of electronic device. According to various embodiments of the present disclosure, an electronic device 201 may omit some elements or may further include additional elements, or some of the elements of the electronic device may be combined with each other to configure a single entity, in which case the electronic device may identically perform the functions of the corresponding elements prior to the combination thereof.

Figure 3:
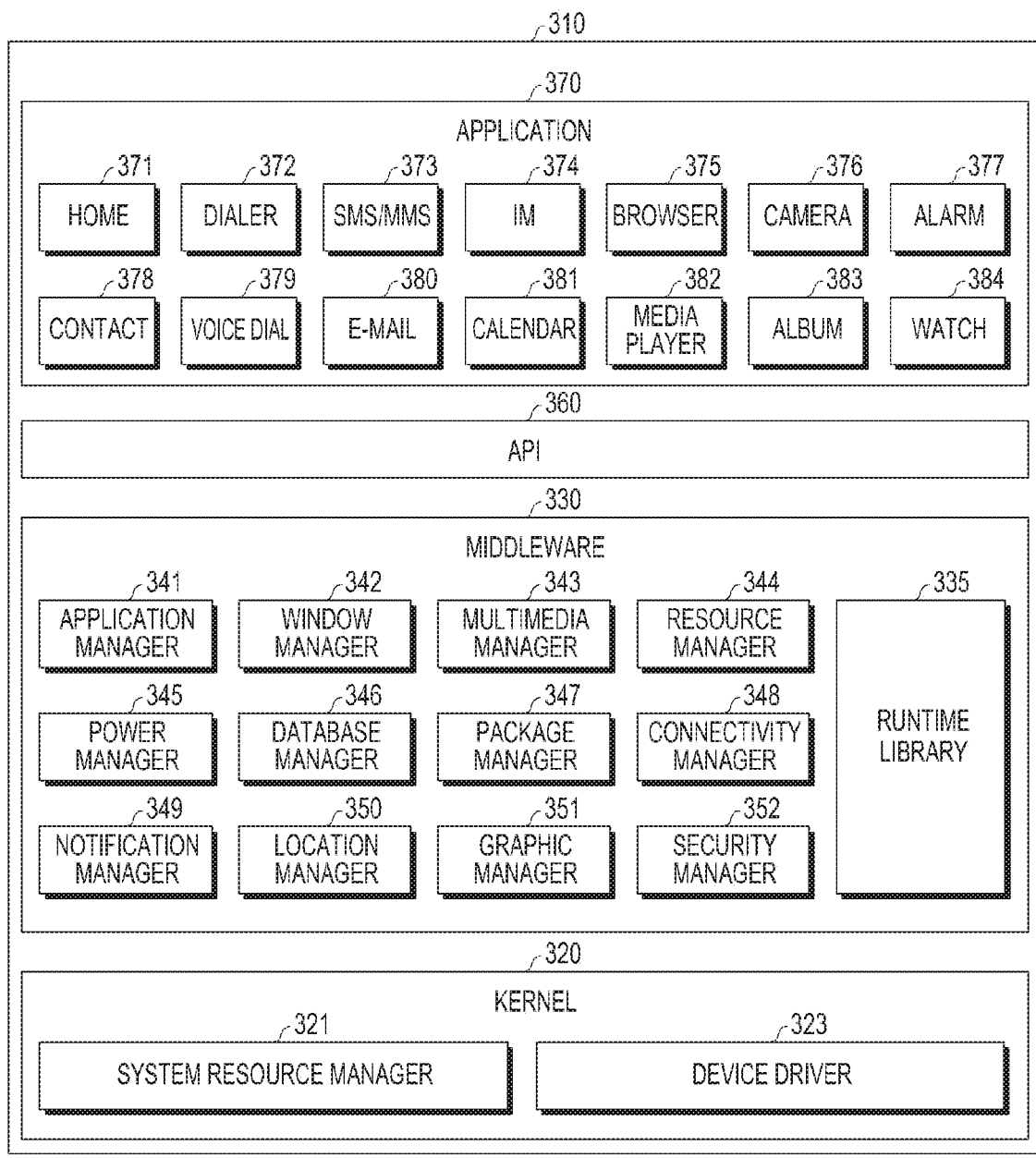
FIG. 3 is a block diagram of a program module, according to various embodiments of the present disclosure.

FIG. 3 is a block diagram of a program module, according to various embodiments of the present disclosure. The program module 310 may include an OS that controls resources relating to an electronic device 101 and/or various applications 370 that are driven on the operating system. The operating system may include, for example, Android™, iOS™, Windows™, Symbian™, Tizen™, or Bada™. Referring to FIG. 3, the program module 310 may include a kernel 320, middleware 330, an API 360, and/or applications 370. At least a part of the program module 310 may be preloaded on the electronic device, or may be downloaded from an external electronic device 102 or 104 or the server 106.

The kernel 320 may include, for example, a system resource manager 321 and/or a device driver 323. The system resource manager 321 may control, allocate, or retrieve system resources. According to an embodiment of the present disclosure, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use the limited system resources within the electronic device. The middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage input/output, manage a memory, or process an arithmetic function. The application manager 341 may manage, for example, the life cycles of the applications 370. The window manager 342 may manage GUI resources used for a screen. The multimedia manager 343 may identify the format required for playing the media files and perform encoding or decoding of the media files by using a codec matching the corresponding format. The resource manager 344 may manage the source code of the application 370 or space in the memory. The power manager 345 manages the capacity, temperature, or power of the battery, for example, and may determine or provide power information necessary for the operation of the electronic device by using the corresponding information. According to an embodiment of the present disclosure, the power manager 345 may operate in conjunction with a basic input/output system (BIOS). The database manager 346 may create, retrieve, or modify a database to be used in the application 370, for example. The package manager 347 may manage the installation or update of an application that is distributed in the form of a package file.

The connectivity manager 348 may, for example, manage the wireless connection. The notification manager 349 may provide, to a user, an event, for example, an arrival message, an appointment, a proximity notification, etc. The location manager 350 may manage, for example, the position information of the electronic device. The graphic manager 351 may manage, for example, a graphical effect to be provided to the user or a user interface related thereto. The security manager 352 may provide, for example, system security or user authentication. According to an embodiment of the present disclosure, the middleware 330 may include a telephony manager for managing a voice or video call function of the electronic device or a middleware module that is capable of forming a combination of the functions of the above-described elements. The middleware 330 may provide specialized modules according to the type of the OS. The middleware 330 may dynamically delete some existing elements or add new elements. The API 360 is, for example, a set of API programming functions, and may be provided with different configurations depending on the OS. For example, in the case of Android or iOS, one API set may be provided for each platform, and in the case of Tizen, two or more API sets may be provided for each platform.

The application 370 may include home application 371, a dialer application 372, an SMS/MMS application 373, an instant message (IM) application 374, a browser application 375, a camera application 376, an alarm application 377, contacts application 378, voice dial application 379, email application 380, a calendar application 381, a media player application 382, an album application 383, a watch application 384, or a healthcare (e.g., to measure exercise quantity or blood glucose level) or environmental information (e.g., atmospheric pressure, humidity, or temperature information) provision application. According to an embodiment of the present disclosure, the applications 370 may include an information exchange application that can support the exchange of information between the electronic device and an external electronic device. The information exchange application may include, for example, a notification relay application for communicating specific information to an external electronic device, or a device management application for managing an external electronic device. For example, the notification relay application may transmit notification information generated in another application of the electronic device to an external electronic device, or may receive notification information from the external electronic device and provide the notification information to the user. The device management application may, for example, control functionality (e.g., turn-on/turn-off the external electronic device itself (or some elements thereof), or adjusts the display brightness (or resolution) of an external electronic device communicating with the electronic device), or may install, delete, or update an application running on the external electronic device. The applications 370 may include applications (e.g., a healthcare application of a mobile medical appliance) that are designated according to the attributes of an external electronic device. The applications 370 may include applications received from an external electronic device. At least some of the program module 310 may be implemented (e.g., executed) by software, firmware, hardware (e.g., the processor 210), or a combination of two or more thereof and may include a module, a program, a routine, an instruction set, or a process for performing one or more functions.

Figure 4:
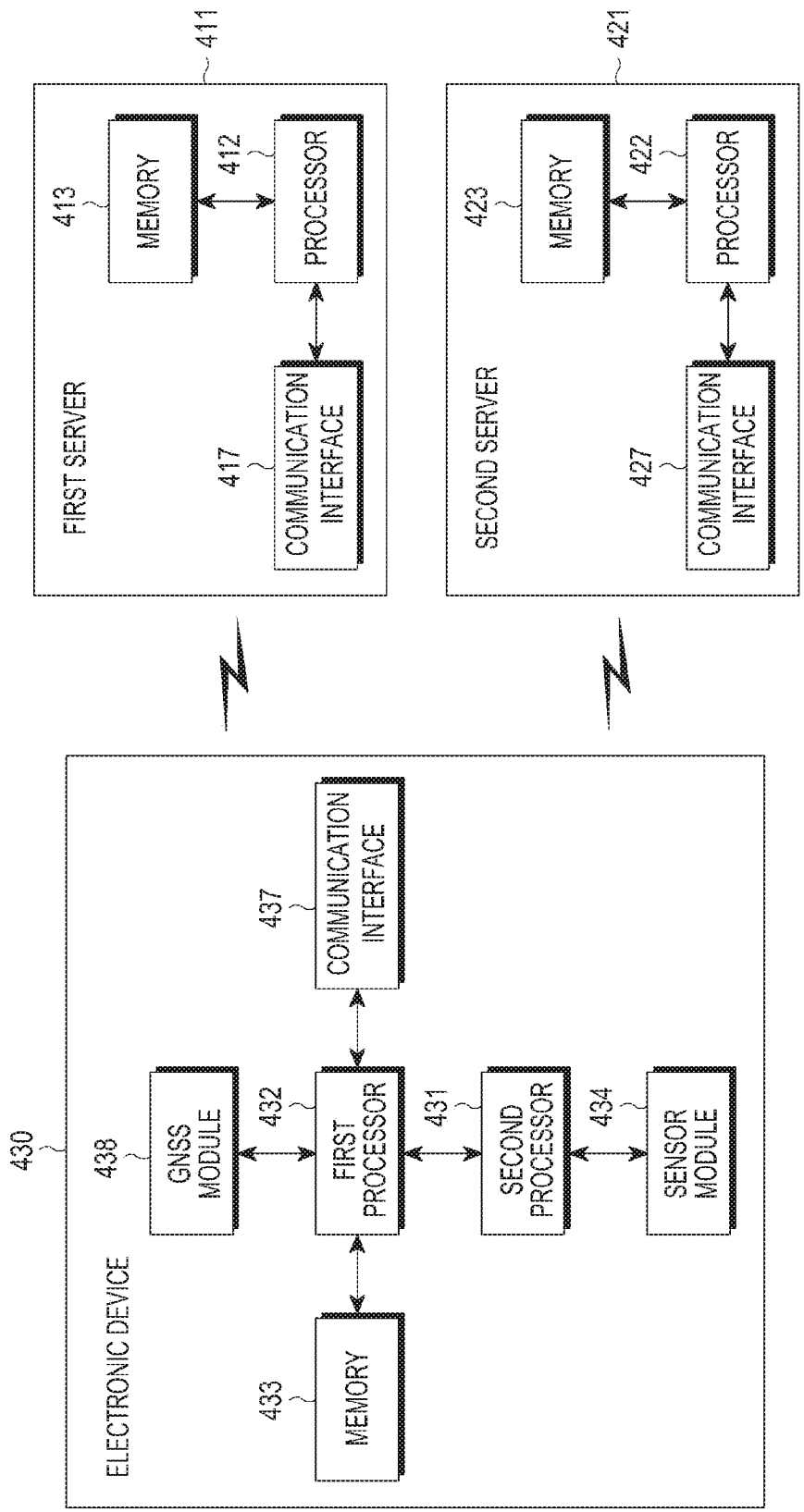
FIG. 4 is a diagram illustrating a communication system, according to various embodiments of the present disclosure.

FIG. 4 illustrates a communication system, according to various embodiments of the present disclosure.

Referring to FIG. 4, the communication system may include a first server 411, a second server 421, and an electronic device 430.

The first server 411 may store layout information (or map information) of a service zone, and may transmit the layout information of the service zone, requested by the electronic device 430, to the electronic device 430.

The first server 411 may include a communication interface 417 for transmitting data (e.g., layout information of a service zone) to the electronic device 430 or receiving data (e.g., a request message for the layout information of the service zone) from the electronic device 430; a memory 413 for storing the layout information of the service zone; and a processor 412 which is functionally connected to other elements of the first server 411 and implements the function of the first server 411 by controlling all or some of the elements. The elements of the first server 411 may be mounted or integrated/coupled to (or located within) a housing or a case.

The second server 421 may receive a signal measurement value (e.g., at least one of a Wi-Fi measurement value, a magnetic field measurement value, a Bluetooth measurement value, or an RFID measurement value) from the electronic device 430, and transmit information on the position of the electronic device 430, which is calculated on the basis of the signal measurement value, to the electronic device 430. Within the service zone, the position of the electronic device 430, which is calculated on the basis of the signal measurement value, may have a higher accuracy than the position accuracy measured using GNSS.

The first server 411 may be integrated into the second server 421, and the second server 421 may transmit the layout information and/or measurement data map of the service zone to the electronic device 430.

The second server 421 may include a communication interface 427 for transmitting data (e.g., at least one of layout information of the service zone, the measurement data map, or position information) to the electronic device 430 or receiving data (e.g., a request message for at least one of the layout information of the service zone, the measurement data map, the measured data/value, or the position information) from the electronic device 430; a memory 423 for storing the layout information of the service zone and/or the measurement data map; and a processor 422 which is functionally connected to other elements of the second server 421 and implements the function of the second server 421 by controlling all or some of the elements. The elements of the second server 421 may be mounted or integrated/coupled to (or located within) a housing or a case.

The electronic device 430 may include a GNSS module 438, a communication interface 437, a sensor module 434, a memory 433, a first processor 432, and a second processor 431.

The GNSS module 438 may measure the position of the electronic device 430. The GNSS module 438 may acquire highly accurate position information in an open area. The first processor 432 may determine whether a service zone exists around the electronic device 430 using the position information of the electronic device 430, which is measured by the GNSS module 438, and may determine whether the electronic device 430 is located within the service zone.

The communication interface 437 may include at least one module that supports at least one communication scheme selected from among Wi-Fi, BT, BLE, RFID, and cellular communication.

The first processor 432 may measure the position of the electronic device 430 using the communication interface 437. When the GNSS module 438 is unable to measure the position or has low measurement accuracy (e.g., when the electronic device 430 is located in a shadow zone or an area having a weak electric field), the first processor 432 may acquire position information using the communication interface 437, the position information having an accuracy relatively higher than that measured by the GNSS module 438. The first processor 432 may provide a higher positioning accuracy by measuring the position using the communication interface within the service zone, in comparison with a positioning accuracy which can be obtained using the GNSS module 438 within the service zone. The communication interface 437 may include the GNSS module 438.

The communication interface 437 may communicate with the first server 411 and/or the second server 421 using at least one communication scheme, and may transmit or receive information required to perform indoor positioning (e.g., internal positioning) to or from the first server 411 and/or the second server 421. The communication interface 437 may receive at least one of the layout information of the service zone, the measurement data map, and the position information from the first server 411 and/or the second server 421. The communication interface 437 may transmit a signal measurement value to the first server 411 and/or the second server 421.

The sensor module 434 may include a motion sensor (e.g., an acceleration sensor, a gyro sensor, a geomagnetic sensor, or an air-pressure sensor). The first processor 432 and/or the second processor 431 may determine the current state (e.g., activity recognition) of a user or the electronic device 430 using the sensor module 434, or may perform pedestrian dead reckoning (PDR). In addition, the first processor 432 and/or the second processor 431 may acquire position information of the electronic device 430 based on at least one piece of data measured by the geomagnetic sensor.

The memory 433 may store the layout information of the service zone, the measurement data map, and instructions or data related to at least one other element of the electronic device 430.

The second processor 431 may be a low power processor. The second processor 431 may receive sensor data from the sensor module 434. The second processor 431 may determine the state of the user or electronic device 430 carrying the electronic device 430 based on the sensor data, or determine movement information (e.g., at least one of a moving path, moving speed, and a moving direction) of the user or the electronic device 430 based on the sensor data. The second processor 431 may transmit, to the first processor 432, the state of the user or the electronic device 430 and/or the movement information of the user or the electronic device 430. The second processor 431 may be selectively removed, and may be included in the first processor 432 or the sensor module 434.

The first processor 432 may be a main processor, and may be a higher performance processor than the second processor 431. The first processor 432 may determine whether the electronic device 430 is located inside or outside the service zone on the basis of at least one of information received from the second processor 431; the state information of the user or the electronic device 430; the movement information of the user or the electronic device 430; sensor data; layout information of the service zone, the measurement data map, and position information, which are acquired through the communication interface 437; or position information acquired through the GNSS module. The first processor 432 may change the priority of the position information acquired through the GNSS module 438 and the position information acquired through the communication interface 437 on the basis of a determination of whether the electronic device 430 is located inside or outside the service zone. For example, the first processor 432 may determine whether the electronic device 430 is within a particular service zone and, on the basis thereof, may select the positioning result of the indoor positioning system, which has a relatively high accuracy and is provided by the service zone, rather than preferentially selecting the position information acquired using the GNSS module 438.

The first processor 432 may determine whether the electronic device 430 is located inside or outside the service zone, using the layout information of the service zone. The first processor 432 may determine whether the electronic device 430 is within close range of the service zone, using the GNSS module 438, and may request the layout information of the service zone from the first server 411 through the communication interface 437 and receive the same. The first processor 432 may determine whether the electronic device 430 is located inside or outside the service zone in real time, using the GNSS module 438. When it is determined that the electronic device 430 is located inside the service zone, the first processor 432 may attempt to perform indoor positioning using the communication interface 437. When it is determined that the indoor positioning is successful and the positioning accuracy is satisfied, the first processor 432 may determine that the electronic device 430 is located within the service zone. The first processor 432 may change the priority such that the high-accuracy indoor positioning information provided by the service zone can be selected, rather than preferentially selecting position information acquired through the GNSS module 438. According to various embodiments of the present disclosure, the electronic device may include a first circuit; a second circuit; a processor electrically connected to the first and second circuits; and a memory electrically connected to the processor. The memory stores instructions, when executed, which cause the processor to execute operations including determining a first position of the electronic device using a first positioning method related to a first circuit (or according to the operation of the first circuit); determining whether the first position is included in a service zone; and determining a second position of the electronic device using a second positioning method related to a second circuit (or according to the operation of the second circuit), based at least partially on whether the first position is included on the service zone.

According to various embodiments of the present disclosure, the electronic device may include a first circuit for measuring positions using a first positioning method; a second circuit for measuring positions using a second positioning method; a memory for storing information on a service zone; and a processor. The processor is configured to identify a first position using the first circuit, determine whether the first position is included in the service zone, identify a second position using the second circuit when the first position is included in the service zone, and determine the second position as a position of the electronic device.

According to various embodiments of the present disclosure, when receiving data from an external electronic device or requesting data from an external electronic device, the electronic device may use at least one communication circuit included in the second circuit.

According to various embodiments of the present disclosure, the second circuit may include a communication circuit, and the processor may be configured to receive the layout information of the service zone from the external electronic device using a communication circuit.

According to various embodiments of the present disclosure, the first positioning method may be a positioning method using GNSS.

According to various embodiments of the present disclosure, the second positioning method may be a positioning method using an indoor positioning system based on a network location provider (NLP) or layout information of a service zone.

According to various embodiments of the present disclosure, the processor may be configured to receive layout information of the service zone from a first server through a communication interface.

According to various embodiments of the present disclosure, the processor may be configured to receive layout information of the service zone from the first server through the communication interface, and the operation of determining whether the first position is included in the service zone is performed based on the layout information.

According to various embodiments of the present disclosure, the processor may be configured to determine, as a second position, the position of the electronic device, which is received from the second server through the communication interface.

According to various embodiments of the present disclosure, the processor may be configured to transmit information related to a signal acquired using the second circuit to an external electronic device, and receive, from the external device, information on a second position based at least partially on information related to a signal acquired using the second circuit.

According to various embodiments of the present disclosure, the processor may be configured to determine, as a second position, the position of the electronic device, which is received from a second server through a communication interface, among the position measured using the first positioning method and the position of the electronic device, which is received from the second server through the communication interface.

According to various embodiments of the present disclosure, when the first position is not identified using the first circuit, the processor may be configured to identify the first position using the second circuit.

According to various embodiments of the present disclosure, the processor may be configured to determine, as a second position, the position measured according to a second positioning method, among a position measured according to a first positioning method and the position measured according to the second positioning method.

According to various embodiments of the present disclosure, the processor may be configured to set the priority of the second positioning method to be higher than that of the first positioning method.

According to various embodiments of the present disclosure, the processor may be configured to determine a third position of the electronic device based on the first positioning method and determine whether a service zone exists around the electronic device based on the third position.

According to various embodiments of the present disclosure, the processor may be configured to determine a third position of the electronic device based on the first positioning method, determine whether a service zone exists around the electronic device based on the third position, and check layout information of the service zone when it is determined that the service zone exists around the electronic device.

According to various embodiments of the present disclosure, the processor may be configured to determine a third position of the electronic device based on the first positioning method, determine whether a service zone exists around the electronic device based on the third position, and when it is determined that the service zone exists around the electronic device, receive layout information of the service zone from the first server through the communication interface.

According to various embodiments of the present disclosure, the processor may be configured to determine a third position of the electronic device based on the first positioning method, determine whether a service zone exists around the electronic device based on the third position, determine whether layout information of the service zone exists when it is determined that a service zone exists around the electronic device, and when it is determined that layout information of the service zone does not exist, receive the layout information of the service zone from the first server through the communication interface.

According to various embodiments of the present disclosure, the processor may be configured to receive, from the second server, a position of the electronic device and position accuracy thereof through the communication interface, and when the accuracy satisfies a preconfigured first condition, determine the received position as a second position.

According to various embodiments of the present disclosure, in the determining of the position of the electronic device, the processor may be configured to check the accuracy of the second position, and determine the second position to be a position of the electronic device when the accuracy satisfies a predetermined condition.

According to various embodiments of the present disclosure, the processor may be configured to receive, from the second server, the position of the electronic device and the position accuracy thereof through the communication interface, and determine the received position of the electronic device to be the second position when the accuracy satisfies a preconfigured first condition and when the difference between the position measured according to the first positioning method and the received position satisfies a second condition.

According to various embodiments of the present disclosure, the processor may be configured to determine, before making a determination of the first position, whether a measurement of the position of the electronic device is possible using the first positioning method, and when measurement of the position of the electronic device is not possible thereby, determine the position of the electronic device using the second positioning method.

According to various embodiments of the present disclosure, the processor may be configured to determine whether measurement of the position of the electronic device is possible according to the second positioning method, and when measurement of the position of the electronic device is not possible according to the second positioning method, determine the position of the electronic device using a third positioning method.

According to various embodiments of the present disclosure, the processor may be configured to identify a third position using a second circuit, identify a fourth position using a first circuit when the third position is not included in the service zone, and determine the fourth position to be another position of the electronic device.

According to various embodiments of the present disclosure, the processor may be configured to determine whether the position of the electronic device, which is measured using the second positioning method or the third positioning method, is included in the service zone, and determine the position of the electronic device using the first positioning method when the position, measured using the second positioning method or the third positioning method, is not included in the service zone.

According to various embodiments of the present disclosure, the third positioning method may be PDR.

According to various embodiments of the present disclosure, the processor may be configured to check a distance between the position of the electronic device and a predetermined point in the service zone, and stop or start, based at least partially on the distance, position measurement using the first circuit (or according to the first positioning method).

According to various embodiments of the present disclosure, the processor may be configured to check a distance between the position of the electronic device and a predetermined point in the service zone, and adjust, based at least partially on the distance, a position measurement period using the first circuit (or using the first positioning method).

Figure 5:
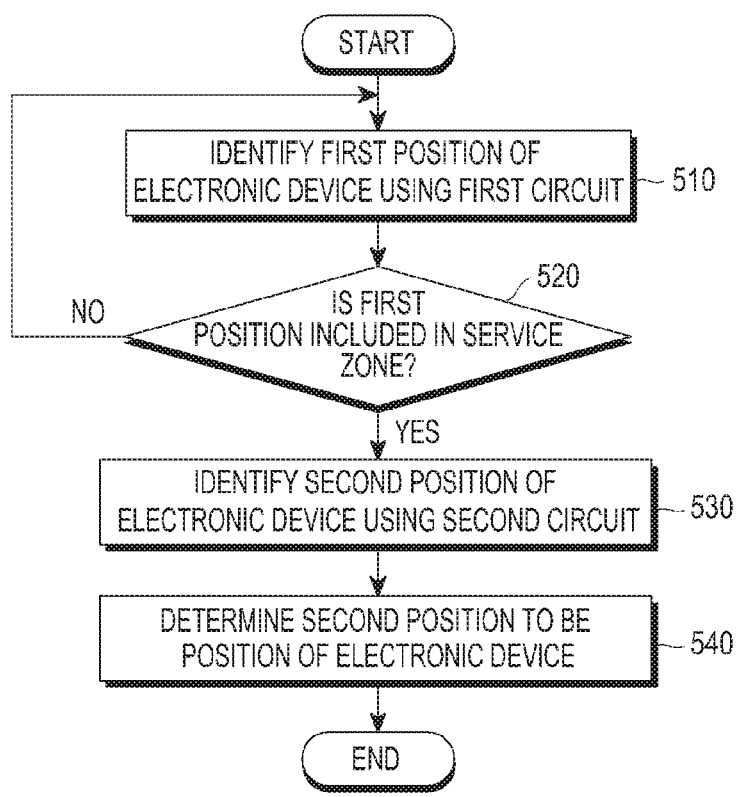
FIG. 5 is a flowchart illustrating a positioning method of an electronic device, according to various embodiments of the present disclosure.

FIG. 5 is a flowchart illustrating a positioning method of an electronic device, according to various embodiments of the present disclosure.

Referring to FIG. 5, the positioning method may include steps 510 to 540. The positioning method may be performed by at least one of an electronic device (e.g., the electronic device 101, 201, or 430), at least one processor (e.g., the processor 120, 210, or 432) of the electronic device, or a control unit of the electronic device.

In step 510, the electronic device may identify a first position of the electronic device using a first circuit (e.g., the GNSS module 227 or 438) for measuring the position using a first positioning method.

According to an embodiment of the present disclosure, the first positioning method may be a positioning method using GNSS.

The GNSS may include at least one of a GPS, a GLONASS, a Galileo, or a compass system (also known as BeiDou-2). The satellites (or space vehicles (SVs)) may be configured to transmit navigation signals for reception by the GNSS module, and the GNSS module may be configured to calculate the position of the electronic device from the received navigation signals. The GNSS module may process the received signals and perform positioning to indicate the current position.

According to an embodiment of the present disclosure, the electronic device may receive information on the first position from an external electronic device through a communication interface.

According to an embodiment of the present disclosure, the first positioning method may be a positioning method using a cell ID or a cell position.

The term "cell" may refer to an area on the earth's surface in which each base station configuring the terrestrial communication system may provide a communication service to the electronic device (e.g., the area in which communication with the electronic device may be performed or which the base station covers). The electronic device may receive, from the base station, information (e.g., a cell ID or a cell position) indicating a sector of the base station, e.g., a communication cell. The information on the communication cell may be a cell ID or a cell position included in a signal received by the electronic device from the base station, a cell ID or a cell position extracted from the received signal, or information similar thereto. The electronic device may determine (or approximate) that the cell position is the position of the electronic device.

In step 520, the electronic device may determine whether the first position is included in the service zone. The electronic device may perform step 530 when the first position is included in the service zone, and may periodically perform step 510 when the first position is not included in the service zone.

According to an embodiment of the present disclosure, the electronic device may receive layout information of the service zone from a first server.

According to an embodiment of the present disclosure, the electronic device may determine a third position of the electronic device before determining the first position based on the first positioning method. The electronic device may determine whether the service zone exists around the electronic device based on the third position.

According to an embodiment of the present disclosure, when it is determined that the service zone exists around the electronic device, the electronic device may check the layout information of the service zone.

According to an embodiment of the present disclosure, when it is determined that the service zone exists around the electronic device, the electronic device may receive the layout information of the service zone from the first server.

According to an embodiment of the present disclosure, the electronic device may determine whether the first position is included in the service zone based on the layout information of the service zone.

According to an embodiment of the present disclosure, the electronic device may check whether the layout information of the service zone exists in the memory of the electronic device. When the layout information of the service zone exists in the memory, the electronic device may use the layout information of the service zone, which is stored in the memory, and when no layout information of the service zone exists in the memory, the electronic device may receive the layout information of the service zone from the first server.

In step 530, when the first position is included in the service zone, the electronic device may identify a second position of the electronic device, using a second circuit (e.g., at least one of the Wi-Fi module 223, the Bluetooth module 225, the NFC module 228, the RF module 229, the sensor module 240 or 434, or the cellular module 221) for measuring the position using a second positioning method.

According to an embodiment of the present disclosure, the second positioning method may be a positioning method using an indoor positioning system based on NLP or layout information of the service zone.

According to an embodiment of the present disclosure, the electronic device may determine the position of the electronic device, which is received from the second server, as the second position of the electronic device.

According to an embodiment of the present disclosure, the electronic device may transmit information related to a signal acquired using the second circuit to an external electronic device, and may receive, from the external electronic device, information on a second position based at least partially on the information related to the signal acquired using the second circuit.

According to an embodiment of the present disclosure, the electronic device may determine, as the second position of the electronic device, the position of the electronic device, which is received from the second server, from among the position measured using the first positioning method and the position received from the second server.

According to an embodiment of the present disclosure, the electronic device may determine, as the second position of the electronic device, the position measured using the second positioning method, from among the position measured using the first positioning method and the position measured using the second positioning method.

According to an embodiment of the present disclosure, the electronic device may set the priority of the second positioning method to be higher than that of the first positioning method.

According to an embodiment of the present disclosure, the electronic device may receive the position of the electronic device and the position accuracy thereof from the second server. When the accuracy satisfies a preconfigured first condition, the electronic device may determine, as the second position of the electronic device, the position received from the second server.

According to an embodiment of the present disclosure, the electronic device may receive, from the second server, the position of the electronic device and the position accuracy thereof.

When the accuracy satisfies the preconfigured first condition and the difference between the position measured using the first positioning method and the position received from the second server satisfies a second condition, the electronic device may determine the position received from the second server to be the second position of the electronic device.

According to an embodiment of the present disclosure, the electronic device may determine the second position of the electronic device by comparing information stored in the memory with a signal obtained by the electronic device, without using a server. For example, the electronic device may receive, from the server, a database, which is created by collecting an RF signal and/or sensor measurement data, and may determine the position by comparing the database with an RF signal and/or sensor measurement data, which are measured by the electronic device.

In step 540, the electronic device may determine, as the position of the electronic device, the second position of the electronic device, which is identified using the second circuit.

Figure 6:
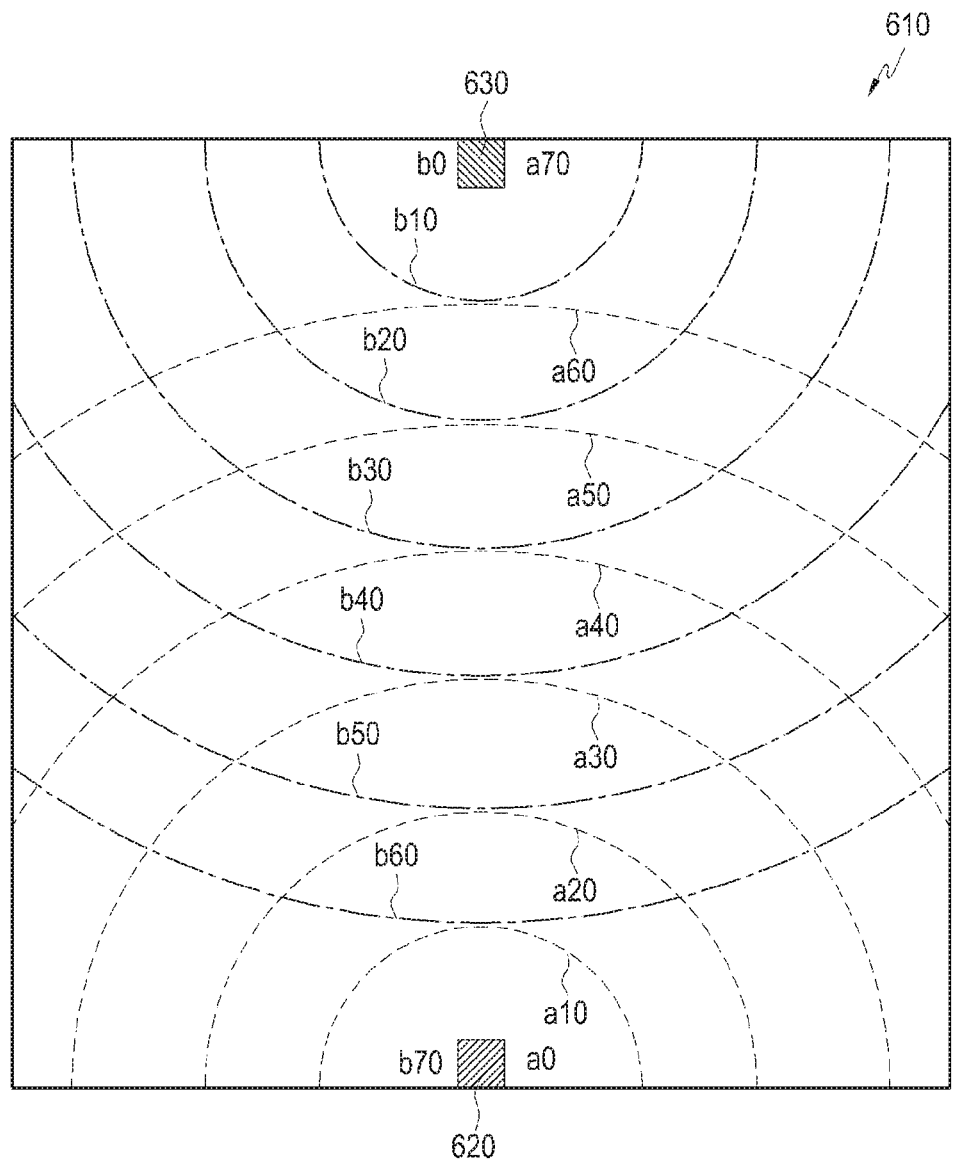
FIG. 6 is a diagram illustrating a signal distribution of a service zone, according to various embodiments of the present disclosure.

FIG. 6 is a diagram illustrating a signal distribution of a service zone, according to various embodiments of the present disclosure.

Referring to FIG. 6, in the case where the first signal transmitter 620 and the second signal transmitter 630 are disposed in a service zone 610, the signal distribution in the service zone 610 may be as illustrated in FIG. 6. When an electronic device receives a signal through a communication interface, a value obtained by measuring the reception strength of a first signal, which is output from the first signal transmitter 620, may be reduced as the electronic device moves further away from the first signal transmitter 620 (e.g., moving along a0→a10→a20→a30→a40→a50→a60→a70). Similarly, a value obtained by measuring the reception strength of a second signal, which is output from the second signal transmitter 630, may be reduced as the electronic device moves further away from the second signal transmitter 630 (e.g., moving along b0→b10→b20→b30→b40→b50→b60→b70).

When the measurement data distribution in the service zone 610 is known, the position of the electronic device in the service zone 610 may be calculated on the basis of the type and the measurement value of a signal received by the electronic device.

Figure 7:
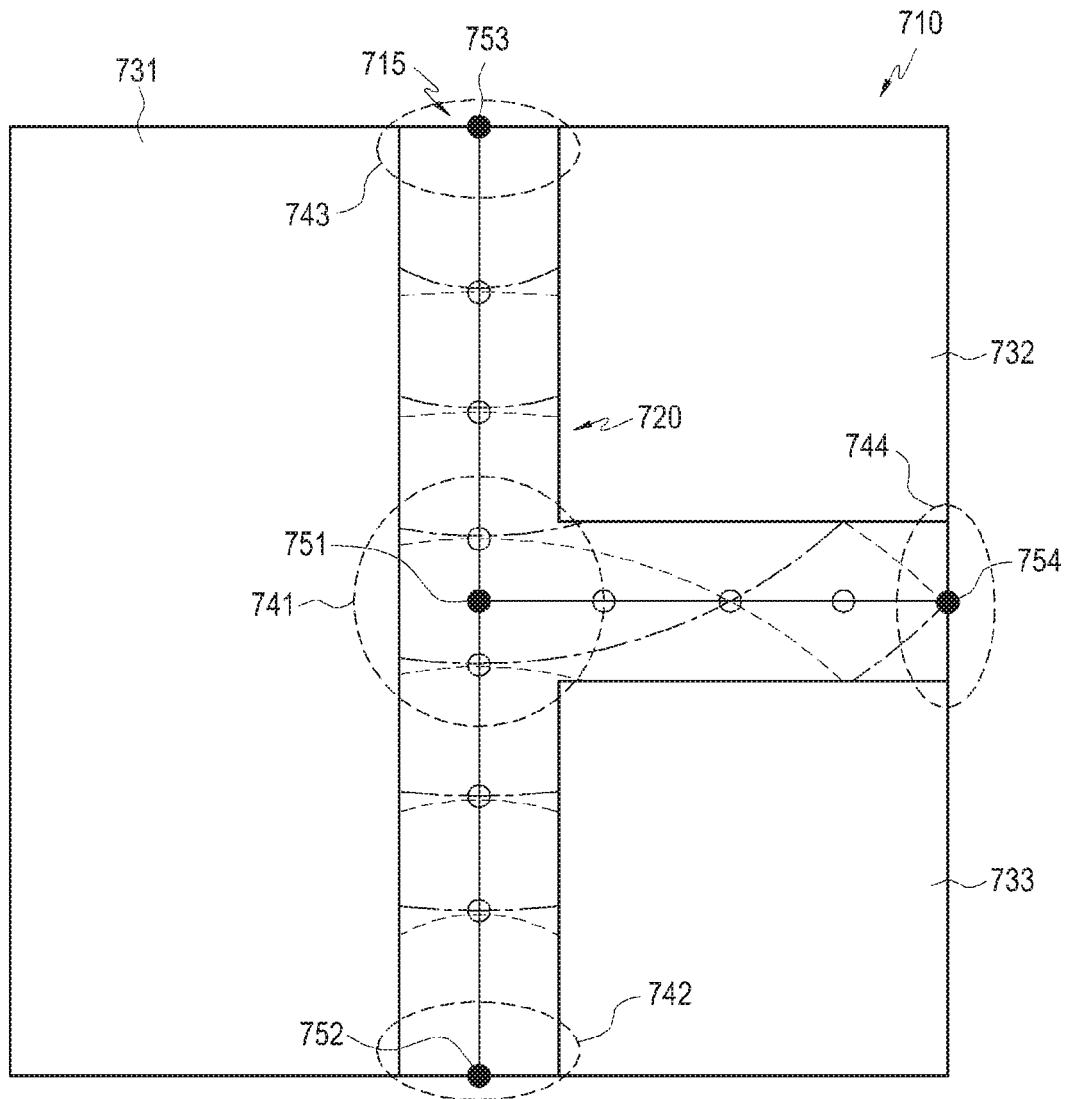
FIG. 7 is a diagram illustrating a layout of a service zone, according to various embodiments of the present disclosure.

FIG. 7 is a diagram illustrating a layout of a service zone, according to various embodiments of the present disclosure.

Referring to FIG. 7, a service zone 710 may be divided into at least one structure of the structures 731, 732, or 733 (e.g., at least one of a shop, a room, a rest room, or a resting place), and the layout 715 of the service zone 710 may include the structures 731, 732, or 733, and at least one path between the structures. At least one path 720 may include one intersection 741 and first to third entrances 742, 743, or 744, respectively.

According to an embodiment of the present disclosure, the second server may create or update a measurement data map for the service zone 710 by associating the measurement value distribution with the layout 715 of the service zone 710. The second server may associate signal measurement values with main points on the at least one path 720.

According to an embodiment of the present disclosure, the measurement data map may include a plurality of data sets. Each data set may be represented by {a position (or coordinates), a measurement value of a first signal, a measurement value of a second signal}, for example, {an x coordinate, a y coordinate, a measurement value of a first signal, a measurement value of a second signal}. For example, when it is assumed that the coordinates of the intersection 741 and the first to third entrances 742, 743 and 744 in the at least one path 720 are represented by {x1, y1}, {x2, y2}, {x3, y3}, and {x4, y4}, respectively, the measurement data map may include data sets (751, 752, 753, and 754) of {x1, y1, a35, b35}, {x2, y2, a0, b70}, {x3, y3, a70, b0}, and {x4, y4, a50, b50}.

According to an embodiment of the present disclosure, the electronic device or the second server may compare the measured signal strength values with the measurement data map and determine the position of the electronic device based on the comparison.

Figure 8:
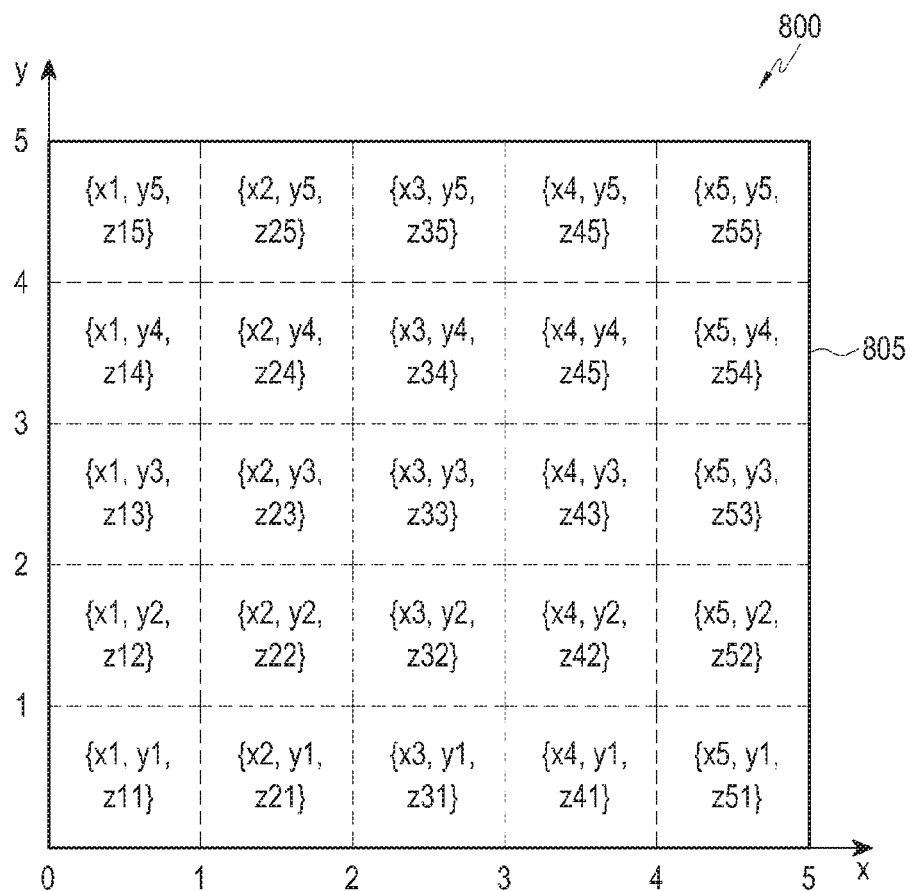
FIG. 8 is a diagram illustrating a magnetic field distribution in a service zone, according to various embodiments of the present disclosure.

FIG. 8 is a diagram illustrating a magnetic field distribution in a service zone, according to various embodiments of the present disclosure.

FIG. 8 illustrates a measurement data map 800 (or a magnetic field distribution map or a magnetic field distribution database) in the service zone, and the position and magnetic field strength in a service zone 805 may be represented by {x-axis position (or horizontal/row position), y-axis position (or vertical/column position), magnetic field strength value}, i.e., {x, y, z}. For example, the position of x=3, y=3 and the magnetic field strength value at the position may be represented by {x3, y3, z33}.

The electronic device may measure neighboring magnetic field strength values (i.e., the values of the strengths of magnetic fields around the electronic device). The electronic device may measure magnetic field strength values using a geomagnetic sensor, a magnetic field sensor, or a magnetic sensor, and the measured magnetic field strength values may be expressed in units of Tesla (T), Gauss (G), or Webber per square meter (Wb/m$^2$), or may be expressed as the output value (e.g., current, voltage, or power) of the sensor, or as normalized numerical values without units.

According to an embodiment of the present disclosure, the electronic device or the second server may compare the measured magnetic field strength values with a measurement data map, and determine the position of the electronic device based on the comparison.

Figure 9:
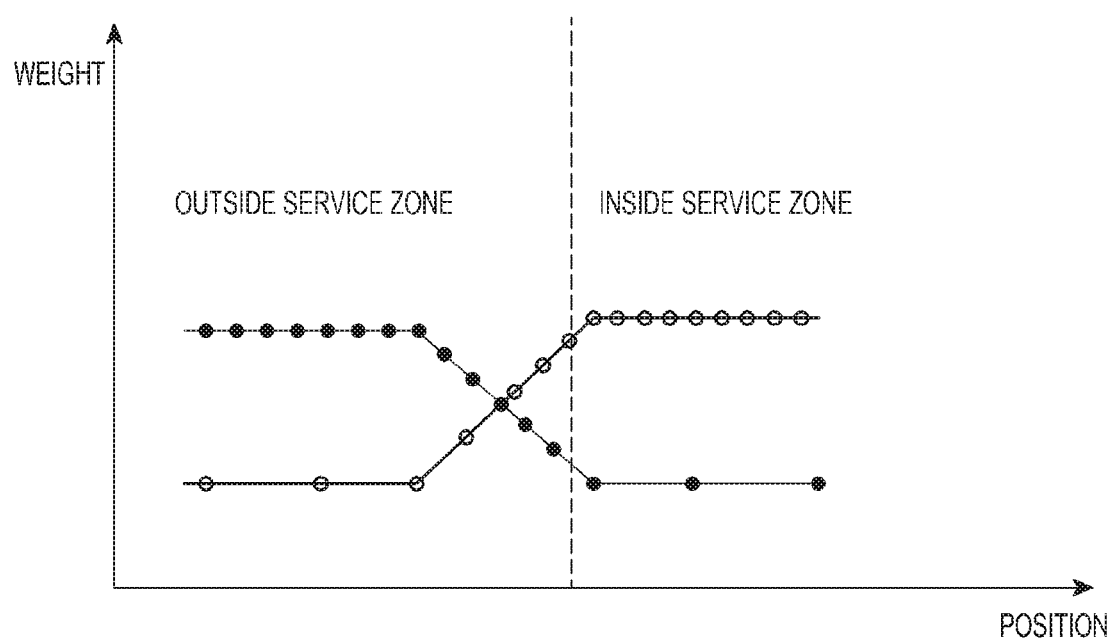
FIG. 9 is a diagram illustrating a positioning method of an electronic device, according to various embodiments of the present disclosure.

FIG. 9 is a diagram illustrating a positioning method of an electronic device, according to various embodiments of the present disclosure.

Referring to FIG. 9, the horizontal axis may represent the position of the electronic device, and the vertical axis may represent the weight or the priority for the positioning method.

According to an embodiment of the present disclosure, when the electronic device is located outside the service zone, the electronic device may set the weight or the priority of the first positioning method to be higher than that of the second positioning method. When the electronic device is located inside the service zone, the electronic device may set the priority of the second positioning method to be higher than that of the first positioning method.

According to an embodiment of the present disclosure, when the electronic device is located outside the service zone, the electronic device may perform positioning according to the first positioning method, and may not perform positioning according to the second positioning method. When the electronic device is located inside the service zone, the electronic device may perform positioning according to the second positioning method, and may not perform positioning according to the first positioning method.

According to an embodiment of the present disclosure, when the electronic device moves out of the service zone, the electronic device may reduce a period/an interval for positioning according to the first positioning method (or increase the frequency of positioning), or increase a period/an interval for positioning according to the second positioning method (or decrease the frequency of positioning). When the electronic device moves inside the service zone, the electronic device may reduce a period/an interval for positioning according to the second positioning method (or increase the frequency of positioning), or increase a period/an interval for positioning according to the first positioning method (or decrease the frequency of positioning).

According to an embodiment of the present disclosure, when the electronic device is located outside the service zone, the electronic device may set the period/interval for positioning according to the first positioning method to be shorter than the period/interval for positioning according to the second positioning method. When the electronic device is located inside the service zone, the electronic device may set the period/interval for positioning according to the first positioning method to be longer than the period/interval for positioning according to the second positioning method.

According to an embodiment of the present disclosure, the electronic device may calculate at least one distance between the position of the electronic device and at least one configured point in the service zone. The electronic device may stop or start position measurement according to the first positioning method, based on the at least one distance.

Figure 10:
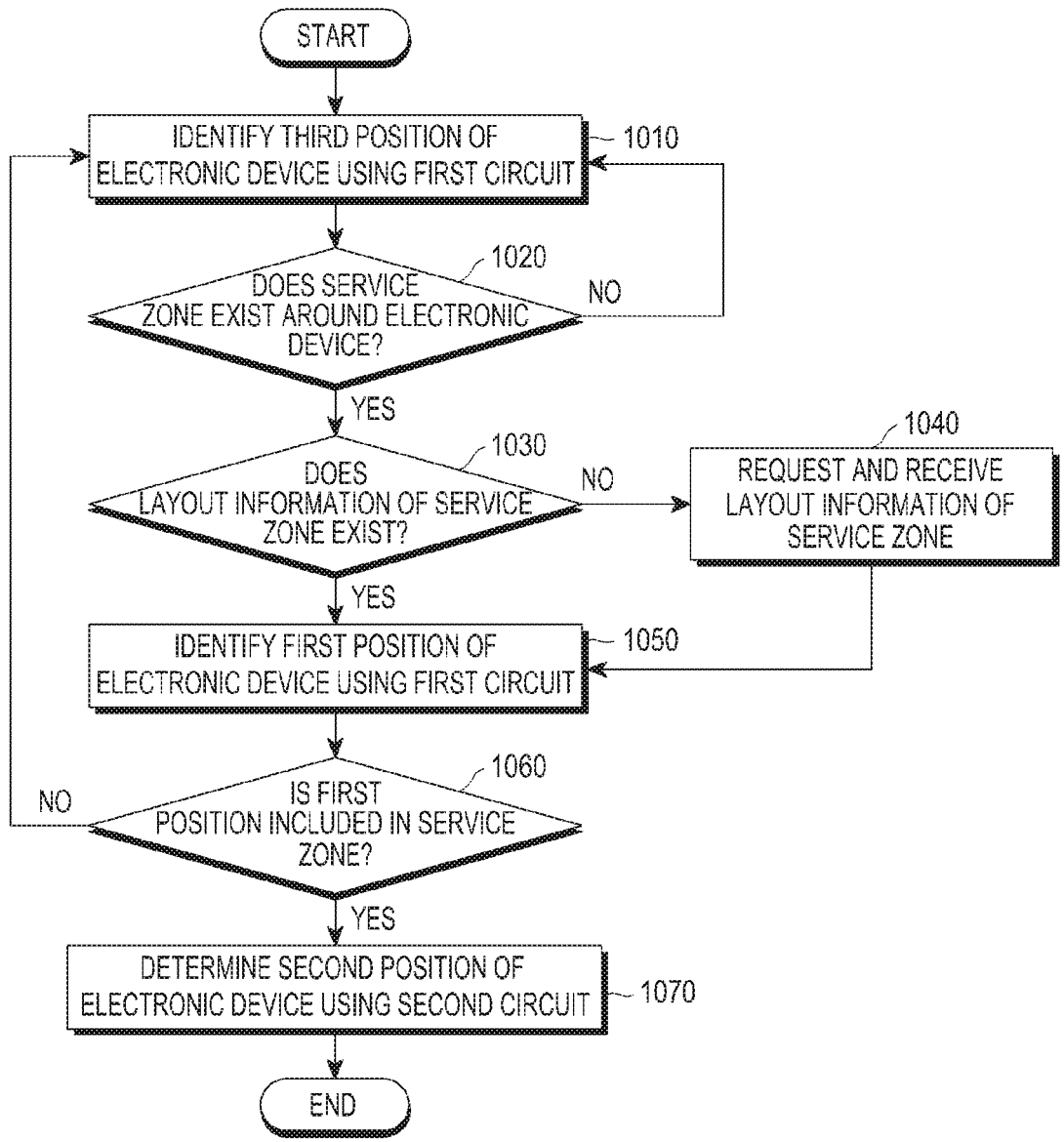
FIG. 10 is a flowchart illustrating a positioning method of an electronic device, according to various embodiments of the present disclosure.

FIG. 10 is a flowchart illustrating a positioning method of an electronic device, according to various embodiments of the present disclosure.

Referring to FIG. 10, the positioning method may include steps 1010 to 1070. The positioning method may be performed by at least one of an electronic device, at least one processor of the electronic device, or a control unit of the electronic device.

In step 1010, the electronic device may identify a third position of the electronic device, using a first circuit (e.g., the GNSS module 227 or 438) for measuring a position using the first positioning method.

According to an embodiment of the present disclosure, the first positioning method may be a positioning method using GNSS.

In step 1020, the electronic device may determine whether a service zone exists around the electronic device based on the third position. The electronic device may perform step 1030 when a service zone exists, and may perform step 1010 when a service zone does not exist. The electronic device may determine whether the service zone exists around the electronic device when the difference between the third position and the position of the service zone (e.g., center position, end position, or gate position) is within a preconfigured threshold.

In step 1030, when it is determined that a service zone exists around the electronic device, the electronic device may determine whether there is layout information of the service zone. The electronic device may check that the layout information of the service zone is stored in the memory. The electronic device may perform step 1050 when there is layout information of the service zone and perform step 1040 when there is no layout information of the service zone.

In step 1040, the electronic device may request layout information of the service zone from a first server through a communication interface, and may receive the layout information of the service zone from the first server.

In step 1050, the first position of the electronic device may be identified using the first circuit (or the first positioning method).

In step 1060, the electronic device may determine whether the first position is included in the service zone. The electronic device may perform step 1070 when the first position is included in the service zone, and may periodically perform step 1010 when the first position is not included in the service zone.

In step 1070, when the first position is included in the service zone, the electronic device may identify and/or determine a second position of the electronic device using a second circuit (e.g., at least one of the Wi-Fi module 223, the Bluetooth module 225, the NFC module 228, the RF module 229, the sensor module 240 or 434, or the cellular module 221) for measuring the position using the second positioning method.

According to an embodiment of the present disclosure, the second positioning method may be a positioning method using an indoor positioning system based on NLP or layout information of the service zone.

According to an embodiment of the present disclosure, the electronic device may set the priority of the second positioning method to be higher than that of the first positioning method.

Figure 11:
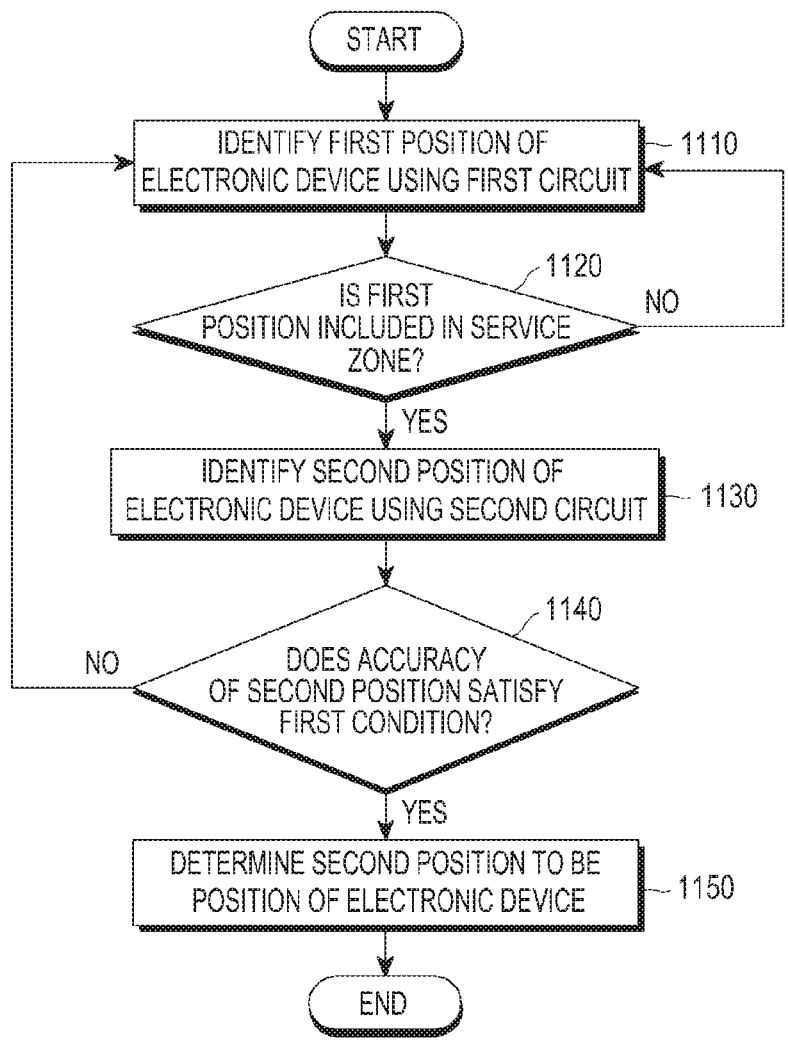
FIG. 11 is a flowchart illustrating a positioning method of an electronic device, according to various embodiments of the present disclosure.

FIG. 11 is a flowchart illustrating a positioning method of an electronic device, according to various embodiments of the present disclosure.

Referring to FIG. 11, the positioning method may include steps 1110 to 1150. The positioning method may be performed by at least one of an electronic device, at least one processor of the electronic device, or a control unit of the electronic device.

In step 1110, a first position of the electronic device may be identified using a first circuit (e.g., the GNSS module) for measuring a position according to a first positioning method.

According to an embodiment of the present disclosure, the first positioning method may be a positioning method using GNSS.

In step 1120, the electronic device may determine whether the first position is included in a service zone. The electronic device may perform step 1130 when the first position is included in the service zone, and may periodically perform step 1010 when the first position is not included in the service zone.

In step 1130, when the first position is included in the service zone, the electronic device may identify a second position of the electronic device using a second circuit (e.g., at least one of the Wi-Fi module, the Bluetooth module, the NFC module, the RF module 229, the sensor module, or the cellular module) for measuring a position according to a second positioning method.

According to an embodiment of the present disclosure, the second positioning method may be a positioning method using an indoor positioning system based on NLP or layout information of the service zone.

In step 1140, the electronic device may determine whether the accuracy of the second position satisfies a predetermined first condition. The electronic device may perform step 1150 when the first condition is satisfied, and may periodically perform step 1110 when the first condition is not satisfied.

In step 1150, when the accuracy of the second position satisfies the first condition, the electronic device may determine the second position to be the position of the electronic device.

According to an embodiment of the present disclosure, the electronic device may determine the second position to be the position of the electronic device when the accuracy of the second position satisfies the first condition and when the difference between the position measured using the first circuit and the second position satisfies a second condition.

According to an embodiment of the present disclosure, the first condition may be satisfied when the accuracy exceeds a threshold, is greater than or equal to a threshold, is less than a threshold, or is less than or equal to a threshold.

According to an embodiment of the present disclosure, the second condition may be satisfied when the difference between the position measured using the first circuit and the second position exceeds a threshold, is greater than or equal to a threshold, is less than a threshold, or is less than or equal to a threshold.

According to an embodiment of the present disclosure, the electronic device may receive the position of the electronic device and the position accuracy from a second server.

According to an embodiment of the present disclosure, the electronic device may set the priority of the second positioning method to be higher than that of the first positioning method.

Figure 12:
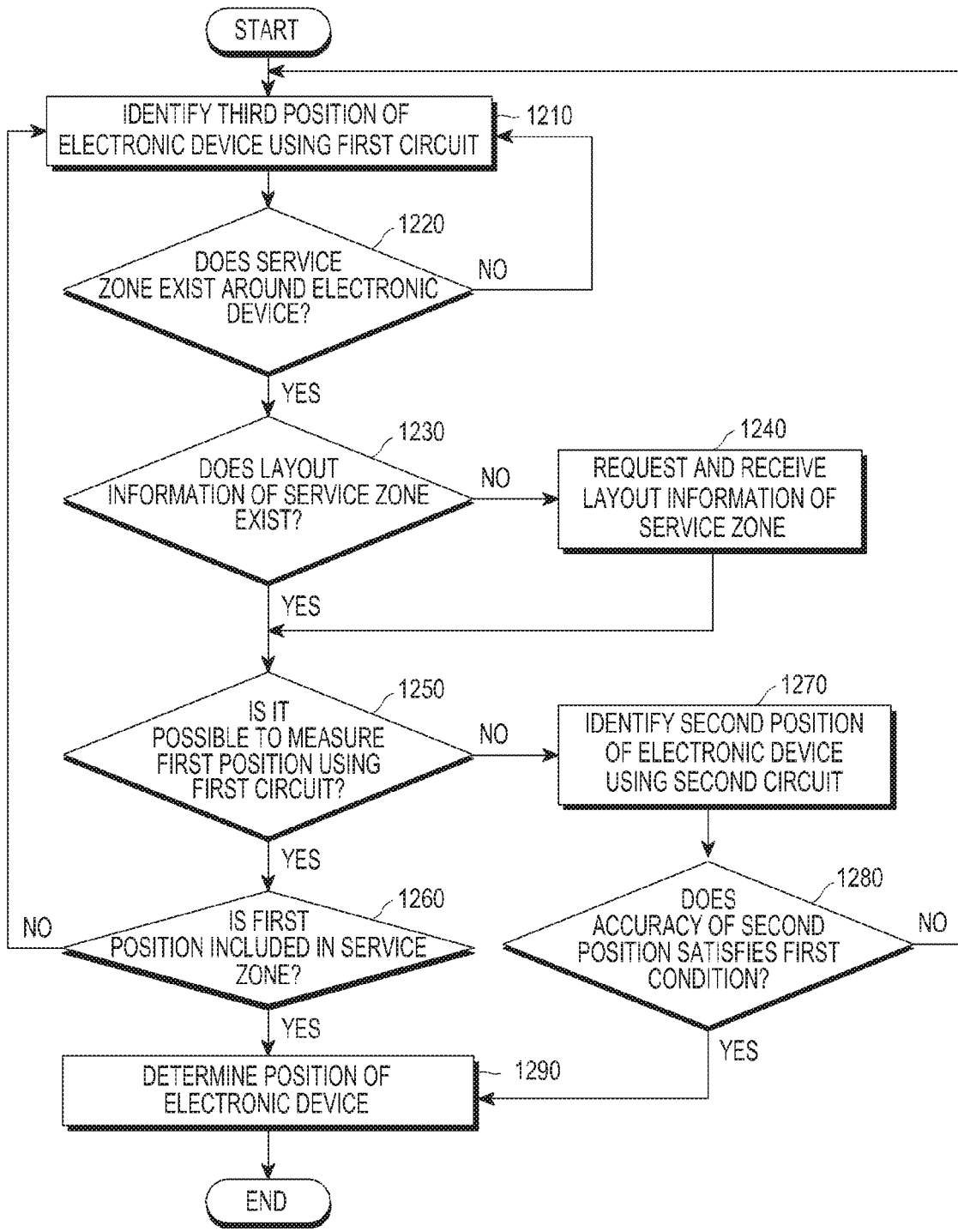
FIG. 12 is a flowchart illustrating a positioning method of an electronic device, according to various embodiments of the present disclosure.

FIG. 12 is a flowchart illustrating a positioning method of an electronic device according, to various embodiments of the present disclosure.

Referring to FIG. 12, the positioning method may include steps 1210 to 1290. The positioning method may be performed by at least one of an electronic device, at least one processor of the electronic device, and a control unit of the electronic device.

In step 1210, the electronic device may identify a third position of the electronic device using a first circuit (e.g., the GNSS module) for measuring the position using the first positioning method.

According to an embodiment of the present disclosure, the first positioning method may be a positioning method using GNSS.

In step 1220, the electronic device may determine whether a service zone exists around the electronic device based on the third position. The electronic device may perform step 1230 when a service zone exists, and may perform step 1210 when a service zone does not exist.

In step 1230, when it is determined that a service zone exists around the electronic device, the electronic device may determine whether there is layout information of the service zone. The electronic device may check whether layout information of the service zone is stored in a memory. The electronic device may perform step 1250 when layout information of the service zone exists, and may perform step 1240 when layout information of the service zone does not exist.

In step 1240, the electronic device may request layout information of the service zone from the first server through a communication interface, and may receive the layout information of the service zone from the first server.

In step 1250, the electronic device may determine whether measurement of the first position of the electronic device is possible using the first circuit (or first positioning method). The electronic device may perform step 1260 when measurement of the first position is possible, and may perform step 1270 when measurement of the first position is not possible.

In step 1270, when measurement of the first position of the electronic device is not possible using the first circuit, the electronic device may identify the second position of the electronic device using a second circuit (e.g., at least one of the Wi-Fi module, the Bluetooth module, the NFC module, the RF module, the sensor module, or the cellular module)

for measuring a position using the second positioning method. The electronic device may check whether the electronic device is located inside the service zone using the second circuit (or the second positioning method).

In step 1280, the electronic device may determine whether the accuracy of the second position satisfies a predetermined first condition. The electronic device may perform step 1290 when the first condition is satisfied, and may periodically perform step 1210 when the first condition is not satisfied.

In step 1260, when measurement of the first position of the electronic device is possible using the first circuit, the electronic device may determine whether the first position is included in the service zone. The electronic device may perform step 1290 when the first position is included in the service zone and may periodically perform step 1210 when the first position is not included in the service zone.

In step 1290, the electronic device may determine the position of the electronic device.

Subsequent to step 1280, when the accuracy of the second position satisfies the first condition, the electronic device may determine the second position to be the position of the electronic device.

Subsequent to step 1260, when the first position is included in the service zone, the electronic device may identify and/or determine the position of the electronic device, using the second circuit (or the second positioning method).

According to an embodiment of the present disclosure, the electronic device may set the priority of the second positioning method to be higher than the priority of the first positioning method.

Figure 13:
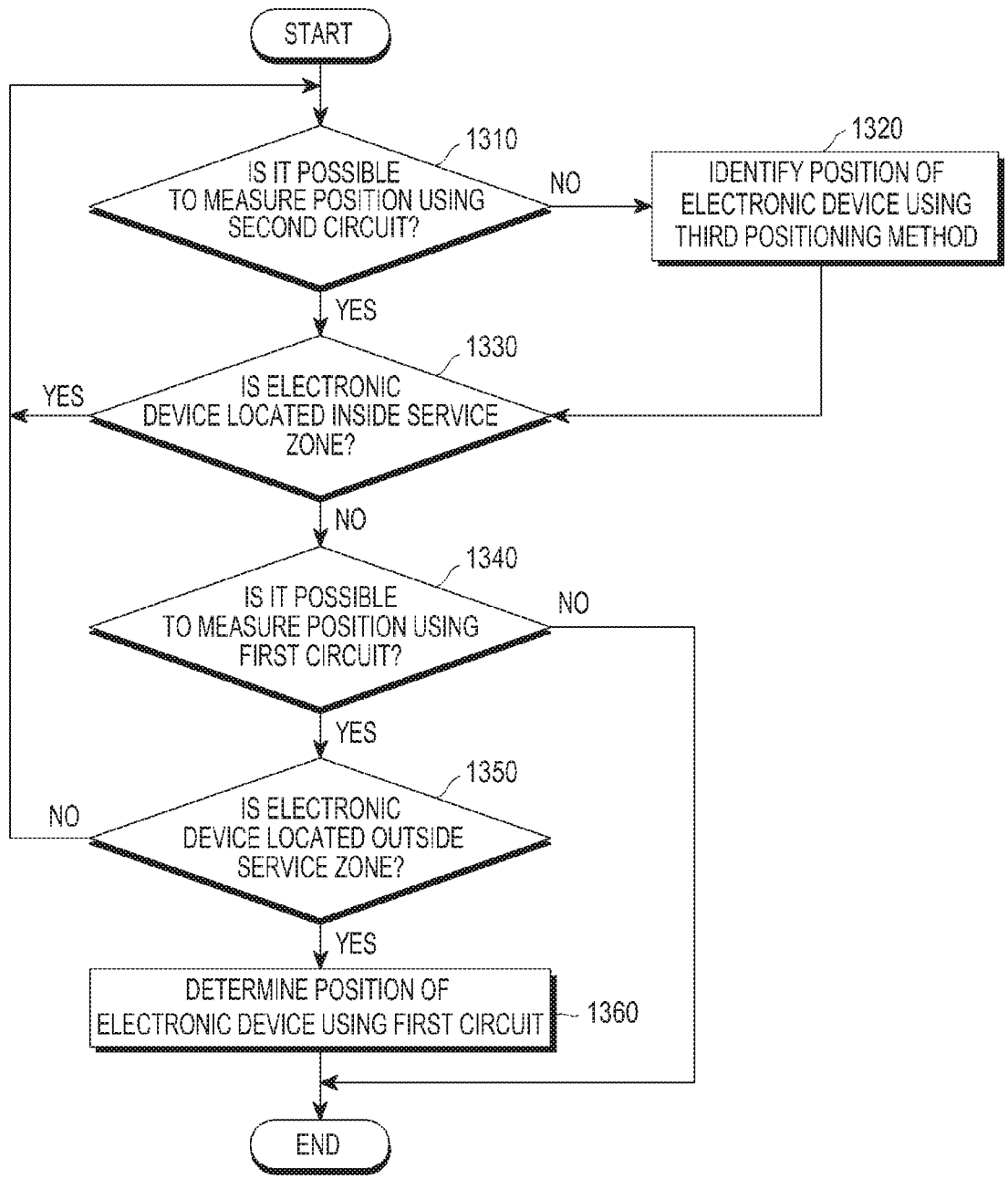
FIG. 13 is a flowchart illustrating a positioning method of an electronic device, according to various embodiments of the present disclosure.

FIG. 13 is a flowchart illustrating a positioning method of an electronic device, according to various embodiments of the present disclosure.

Referring to FIG. 13, the positioning method may include steps 1310 to 1360. The positioning method may be performed by at least one of an electronic device, at least one processor of the electronic device, or a control unit of the electronic device.

In step 1310, the electronic device may determine whether the measurement of the position of the electronic device is possible using a second circuit (e.g., at least one of the Wi-Fi module, the Bluetooth module, the NFC module, the RF module, the sensor module, or the cellular module) for measuring the position using a second positioning method. The electronic device may perform step 1330 when position measurement is possible using the second circuit, and may perform step 1320 when position measurement is not possible using the second circuit.

In step 1320, when position measurement of the electronic device according to the second positioning method is not possible, the electronic device may identify the position of the electronic device using a third positioning method.

According to an embodiment of the present disclosure, the third positioning method may be a PDR method.

In step 1330, the electronic device may determine whether the electronic device is located in a service zone.

Subsequent to step 1310, when the position measurement of the electronic device according to the second positioning method is possible, the electronic device may determine whether the electronic device is located in a service zone.

Subsequent to step 1320, the electronic device may determine whether the electronic device is located in a service zone based on the position measured by the third positioning method.

The electronic device may perform step 1340 when the electronic device is not located in a service zone, and may periodically perform step 1310 when the electronic device is located in a service zone.

In step 1340, when the electronic device is not located in a service zone, the electronic device may determine whether measurement of the position of the electronic device is possible using a first circuit for measuring the position using a first positioning method. The electronic device may perform step 1350 when position measurement is possible, and may periodically perform step 1310 when position measurement is not possible.

In step 1350, when it is possible to measure the position of the electronic device using the first circuit, the electronic device may determine whether the electronic device is located outside the service zone.

The electronic device may perform step 1360 when the electronic device is located outside the service zone, and may periodically perform step 1310 when the electronic device is not located outside the service zone.

In step 1360, the electronic device may identify and/or determine the position of the electronic device using the first circuit (or first positioning method) when it is located outside the service zone (or when the position measured by the third positioning method is not included in the service zone).

According to an embodiment of the present disclosure, the electronic device may set the priority of the second positioning method to be higher than that of the first positioning method.

According to various embodiments of the present disclosure, a positioning method of an electronic device may include identifying a first position of the electronic device using a first positioning method; determining whether the first position is included in a service zone; identifying a second position of the electronic device using a second positioning method when the first position is included in the service zone; and determining the second position to be a position of the electronic device.

According to various embodiments of the present disclosure, identifying the second position of the electronic device may include transmitting, to an external electronic device, information related to a signal acquired by the electronic device; and receiving, from the external electronic device, information on the second position based at least partially on the information.

According to various embodiments of the present disclosure, the positioning method of the electronic device may further include identifying the first position using the second positioning method when the first position cannot be identified using the first positioning method.

According to various embodiments of the present disclosure, determining the second position to be the position of the electronic device may include checking the accuracy of the second position; and determining the second position to be the position of the electronic device when the accuracy satisfies a predetermined condition.

According to various embodiments of the present disclosure, the positioning method of the electronic device may further include checking a distance between the position of the electronic device and a predetermined point of the service zone; and adjusting, based at least partially on the distance, a position measurement period using the first positioning method.

Figure 14A:
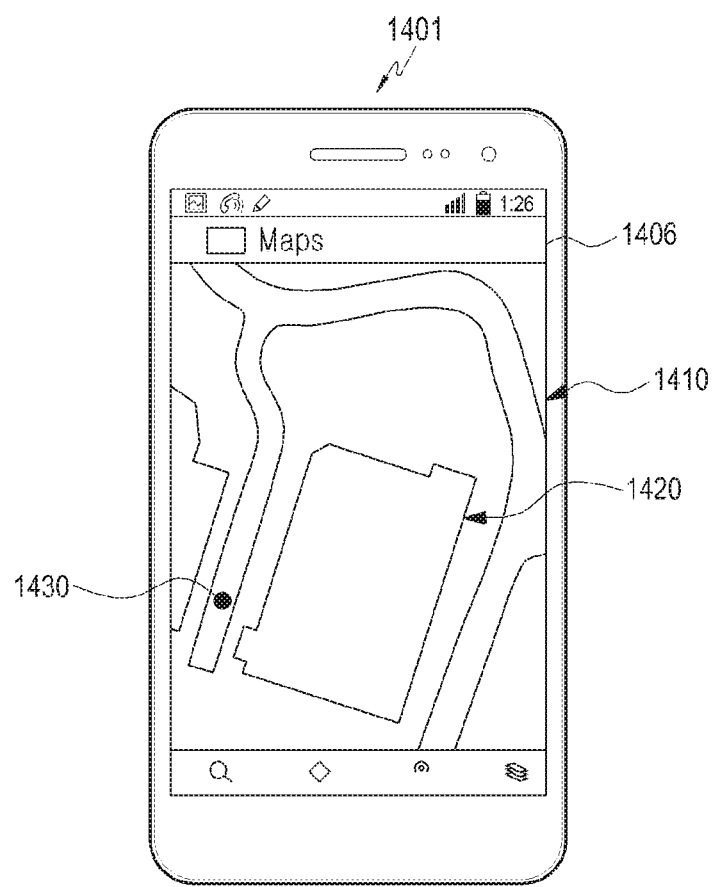
FIGS. 14A to 14C are screenshot diagrams illustrating a position-based service method of an electronic device, according to various embodiments of the present disclosure.
Figure 14B:
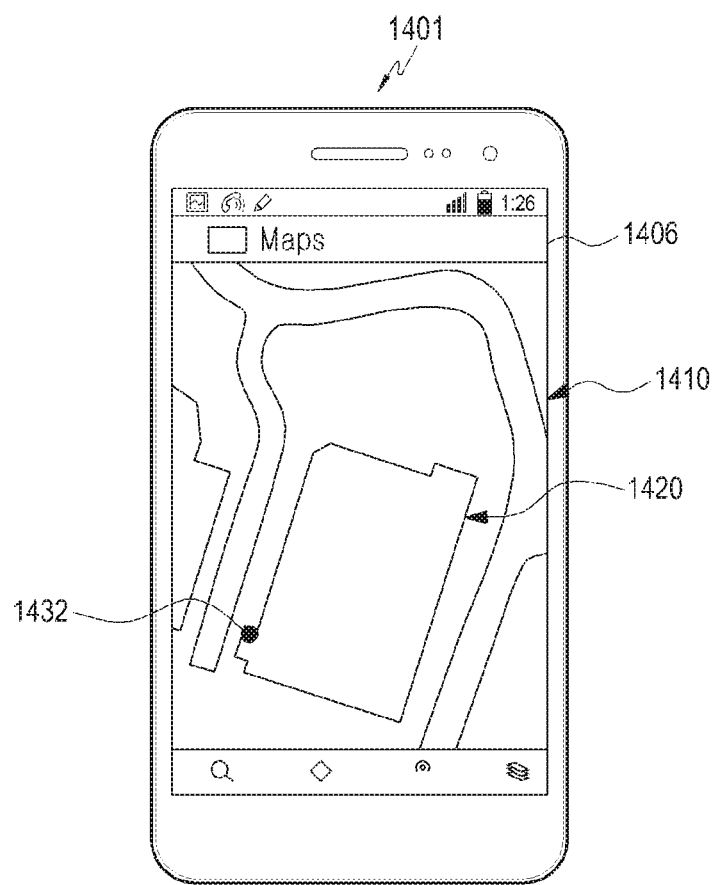
Figure 14C:
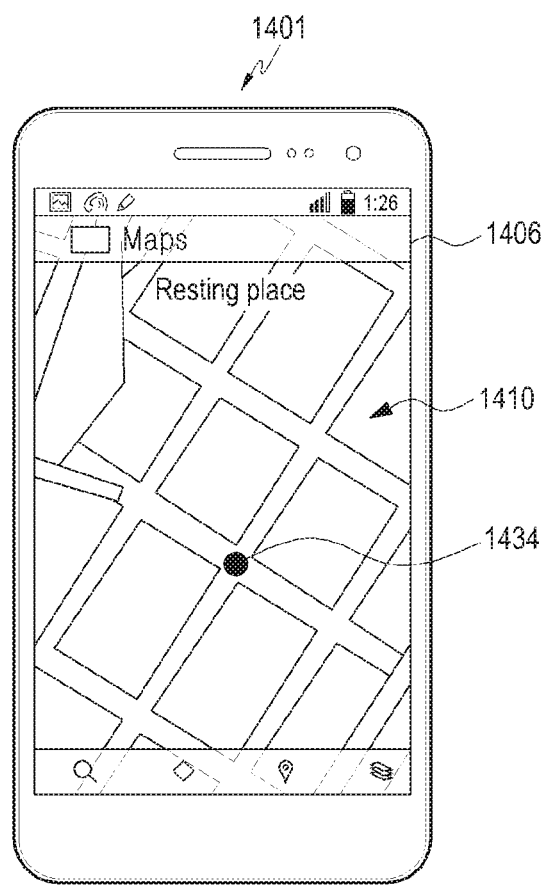

FIGS. 14A to 14C are diagrams illustrating a position-based service method of an electronic device, according to various embodiments of the present disclosure.

A display 1406 of an electronic device 1401 displays an outdoor map screen 1410 and a current position 1430 of a user.

Referring to FIG. 14A, the electronic device 1401 may identify the position 1430 of the electronic device 1401 using a first circuit (e.g., the GNSS module) for measuring the position using a first positioning method.

The electronic device 1401 may determine whether a service zone 1420 exists around the electronic device 1401 based on the position 1430 measured using the first circuit.

When it is determined that a service zone 1420 exists around the electronic device 1401, the electronic device 1401 may determine whether there is layout information of the service zone 1420.

Referring to FIG. 14B, the electronic device 1401 may determine whether a position 1432 measured using the first circuit is included in the service zone 1420.

Referring to FIG. 14C, when the position 1432 measured using the first circuit is included in the service zone 1420, the electronic device 1401 may identify and/or determine a position 1434 of the electronic device using a second circuit (e.g., at least one of the Wi-Fi module, the Bluetooth module, the NFC module, the RF module, the sensor module, or the cellular module) for measuring the position using a second positioning method. The display 1406 of the electronic device 1401 may display an indoor map screen 1440 and the current position 1434 of the user.

The term "module" as used herein may include a unit consisting of hardware, software, or firmware, and may, for example, be used interchangeably with the term "logic", "logical block", "component", "circuit", etc. The term "module" may be an integrally constructed component or a minimum unit or part thereof that performs one or more functions. The "module" may be mechanically or electronically implemented and may include, for example, an application specific integrated circuit (ASIC) chip, a field programmable gate arrays (FPGA), or a programmable-logic device, which has been known or is to be developed in the future, for performing certain operations. At least some of devices (e.g., modules or functions thereof) or methods (e.g., operations) according to various embodiments of the present disclosure may be implemented by an instruction which is stored in a non-transitory computer-readable storage medium in the form of a program module. The instruction, when executed by a processor, may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instructions may include code generated by a compiler or code that may be executed by an interpreter.

According to various embodiments of the present disclosure, a storage medium may have instructions stored thereon, and when executed by at least one processor, the instructions may be configured to cause the at least one processor to execute at least one operation, the operations including identifying a first position of an electronic device using a first positioning method; determining whether the first position is included in a service zone; identifying a second position of the electronic device using a second positioning method when the first position is included in the service zone; and determining the second position to be a position of the electronic device.

The programming module according to the present disclosure may include one or more of the aforementioned components, or may further include other additional components, or some of the aforementioned components may be omitted. Operations performed by a module, a programming module, or other elements according to various embodiments of the present disclosure may be executed sequentially, in parallel, repeatedly, or in a heuristic manner. At least some operations may be executed according to another sequence, may be omitted, or may further include other operations.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An electronic device comprising:
   a first circuit for measuring positions using a first positioning method;
   a second circuit for measuring positions using a second positioning method;
   a memory for storing information on a service zone in which indoor positioning service information is provided; and
   a processor configured to:
     identify a first position using the first circuit;
     determine whether the first position is within the service zone based on the stored information on the service zone;
     identify a second position using the second circuit when the first position is within the service zone; and
     determine the second position to be a position of the electronic device.

2. The electronic device of claim 1, wherein the second circuit comprises a communication circuit, and the processor is further configured to receive layout information of the service zone from an external electronic device, using the communication circuit.

3. The electronic device of claim 1, wherein the processor is further configured to:
   transmit, to an external electronic device, information related to a signal acquired using the second circuit; and
   receive, from the external electronic device, information on the second position based at least partially on the information.

4. The electronic device of claim 1, wherein the processor is further configured to identify the first position using the second circuit when the first position is not identified using the first circuit.

5. The electronic device of claim 1, wherein the processor is further configured to set the second position to have a priority higher than that of the first position.

6. The electronic device of claim 1, wherein the first positioning method is a positioning method using a global navigation satellite system (GNSS).

7. The electronic device of claim 1, wherein, in determining the position of the electronic device, the processor is further configured to:
   check an accuracy of the second position; and
   determine the second position to be the position of the electronic device when the accuracy satisfies a predetermined condition.

8. The electronic device of claim 1, wherein the processor is further configured to:

identify a third position using the second circuit;
identify a fourth position using the first circuit when the third position is not included in the service zone; and
determine the fourth position to be another position of the electronic device.

9. The electronic device of claim 1, wherein the processor is further configured to:
check a distance between the position of the electronic device and a predetermined point of the service zone; and
stop or start position measurement using the first circuit based at least partially on the distance.

10. The electronic device of claim 1, wherein the processor is further configured to:
check a distance between the position of the electronic device and a predetermined point of the service zone; and
adjust, based at least partially on the distance, a position measurement period using the first circuit.

11. A positioning method of an electronic device, comprising:
identifying a first position of the electronic device using a first positioning method;
determining whether the first position is within a service zone in which indoor positioning service information is provided, based on prestored information on the service zone;
identifying a second position of the electronic device using a second positioning method when the first position is within the service zone; and
determining the second position to be a position of the electronic device.

12. The method of claim 11, wherein identifying the second position of the electronic device comprises:
transmitting, to an external electronic device, information related to a signal acquired by the electronic device; and
receiving, from the external electronic device, information on the second position based at least partially on the information.

13. The method of claim 11, further comprising:
identifying the first position using the second positioning method when the first position is not identified using the first positioning method.

14. The method of claim 11, wherein determining the second position to be the position of the electronic device comprises:
checking an accuracy of the second position; and
when the accuracy satisfies a predetermined condition, determining the second position to be the position of the electronic device.

15. The method of claim 11, further comprising:
checking a distance between the position of the electronic device and a predetermined point of the service zone; and
adjusting, based at least partially on the distance, a position measurement period using the first positioning method.

16. A storage medium storing instructions which, when executed by at least one processor, cause the at least one processor to execute at least one operation comprising:
identifying a first position of an electronic device using a first positioning method;
determining whether the first position is within a service zone in which indoor positioning service information is provided, based on prestored information on the service zone;
identifying a second position of the electronic device using a second positioning method when the first position is within the service zone; and
determining the second position to be a position of the electronic device.

17. The storage medium of claim 16, wherein identifying the second position of the electronic device comprises:
transmitting, to an external electronic device, information related to a signal acquired by the electronic device; and
receiving, from the external electronic device, information on the second position based at least partially on the information.

18. The storage medium of claim 16, wherein the at least one operation further comprises identifying the first position using the second positioning method when the first position is not identified using the first positioning method.

19. The storage medium of claim 16, wherein determining the second position to be the position of the electronic device comprises:
checking an accuracy of the second position; and
when the accuracy satisfies a predetermined condition, determining the second position to be the position of the electronic device.

20. The storage medium of claim 16, wherein the at least one operation further comprises:
checking a distance between the position of the electronic device and a predetermined point of the service zone; and
adjusting, based at least partially on the distance, a position measurement period using the first positioning method.

* * * * *